United States Patent
Wang et al.

(10) Patent No.: US 8,171,389 B2
(45) Date of Patent: May 1, 2012

(54) METHOD OF HIERARCHICAL PROCESSING OF A DOCUMENT AND SYSTEM THEREFOR

(75) Inventors: Donglin Wang, Beijing (CN); Xu Guo, Beijing (CN); Changwei Liu, Beijing (CN); Kaihong Zou, Beijing (CN); Xiaoqing Lu, Beijing (CN)

(73) Assignee: Sursen Corp., Beijing (CN)

( * ) Notice: Subject to any disclaimer, the term of this patent is extended or adjusted under 35 U.S.C. 154(b) by 973 days.

(21) Appl. No.: 12/133,300

(22) Filed: Jun. 4, 2008

(65) Prior Publication Data

US 2008/0263068 A1    Oct. 23, 2008

Related U.S. Application Data

(63) Continuation of application No. PCT/CN2006/003295, filed on Dec. 5, 2006.

(30) Foreign Application Priority Data

Dec. 5, 2005 (CN) .......................... 2005 1 0126683
Dec. 12, 2005 (CN) .......................... 2005 1 0131641

(51) Int. Cl.
    *G06F 17/30* (2006.01)
    *G06F 9/44* (2006.01)

(52) U.S. Cl. ........ 715/204; 715/234; 715/243; 717/110; 717/115

(58) Field of Classification Search .................. 715/204, 715/205, 209, 226, 229, 234, 243, 247, 251, 715/253, 255, 256, 700, 713, 731, 744, 760, 715/787, 788, 860, 200–202; 717/100, 103, 717/105, 106, 107, 108, 109, 110, 111, 113, 717/115, 118, 122, 125, 136, 140, 152, 153, 717/159, 165, 170

See application file for complete search history.

(56) References Cited

U.S. PATENT DOCUMENTS

| | | | | |
|---|---|---|---|---|
| 5,434,962 | A | | 7/1995 | Kyojima et al. ............... 395/145 |
| 6,854,087 | B1 | * | 2/2005 | Takeo et al. ................... 715/203 |
| 7,035,837 | B2 | * | 4/2006 | Reulein et al. ........................ 1/1 |
| 7,406,599 | B1 | * | 7/2008 | Pravetz et al. ................ 713/176 |
| 7,562,215 | B2 | * | 7/2009 | Cummins ..................... 713/165 |
| 7,672,003 | B2 | * | 3/2010 | Dowling et al. ............. 358/1.15 |

(Continued)

FOREIGN PATENT DOCUMENTS

CN                  1488111 A      4/2004

(Continued)

OTHER PUBLICATIONS

European Supplementary Search Report mailed Jun. 8, 2009, EPO Application No. 06828247.

(Continued)

*Primary Examiner* — Maikhanh Nguyen
(74) *Attorney, Agent, or Firm* — David Xue; Goodwin Procter LLP

(57) ABSTRACT

The present invention discloses a method for processing document data, wherein the document data comprises at least one page in order and the page comprising at least one layer in order, the method comprises: managing and controlling the at least one layer respectively. The technical scheme of the present invention enables process a document on layers in the docbase management system and provides more flexible document processing.

11 Claims, 11 Drawing Sheets

U.S. PATENT DOCUMENTS

| | | | |
|---|---|---|---|
| 2003/0055871 A1 | 3/2003 | Roses | 709/203 |
| 2003/0056177 A1 | 3/2003 | Nara et al. | |
| 2003/0144982 A1 | 7/2003 | Reulein et al. | |
| 2004/0003248 A1 | 1/2004 | Arkhipov | 713/170 |
| 2004/0163049 A1* | 8/2004 | Mori et al. | 715/527 |
| 2004/0237035 A1 | 11/2004 | Cummins | |
| 2005/0086584 A1 | 4/2005 | Sampathkumar | |
| 2005/0097077 A1 | 5/2005 | Bolosky et al. | |
| 2005/0216886 A1 | 9/2005 | Washburn | 717/110 |
| 2007/0226204 A1* | 9/2007 | Feldman | 707/5 |

FOREIGN PATENT DOCUMENTS

| | | |
|---|---|---|
| CN | 1504925 | 6/2004 |
| CN | 1504925 A | 6/2004 |
| CN | 1558594 A | 12/2004 |
| CN | 1647035 | 7/2005 |
| JP | 2005-122398 A | 5/2005 |
| JP | 2005-063320 | 10/2005 |
| WO | 02/057962 A | 7/2002 |
| WO | 2007/065353 A1 | 6/2007 |

OTHER PUBLICATIONS

European Supplementary Search Report mailed Feb. 26, 2009, EPO Application No. 06828249.

European Supplementary Search Report mailed Mar. 2, 2009, EPO Application No. 06828251.

XP-002515073, "Open Document Management API", Internet, [Online], Version 1.0a, Dec. 18, 1995, pp. 1-31, http://www.stillhq.com/odma/odma10.pdf.

XP-002515124, "Open Document Management API: Version 1.5" Internet, [Online], Oct. 11, 1996, pp. 1-40, http://www.stillhq.com/odma/odma15.pdf.

XP-024226192, Hunter R. et al., "ODA: a document architecture for open systems", Computer Communications, Elsevier Science Publishers BV. Amsterdam, NL, vol. 12, No. 2, Apr. 1, 1989, pp. 69-79.

XP-010133703, Farrow G S D et al., "Conversion of scanned documents to the open document architecture" Proceedings of the International Conference on Acoustics, Speech, and Signal Processing (ICASSP), vol. v, Apr. 19, 2004, pp. V/109-V/112.

XP-002395160, Phelps T A et al., "Multivalent Documents" Communications of the Association for Computer Machinery, ACM, New York, NY, U.S., vol. 43, No. 6, Jun. 1, 2000, pp. 83-90.

XP-010156878, Phelps T A et al., "Multivalent documents: inducing structure and behaviors in online digital documents", System Sciences, 1996, Proceedings of the Twenty-Ninth Hawaii International Conference, vol. 5, Jan. 3, 1996, pp. 144-152.

XP-002312369, IETF: "XML-Signature Syntax and Processing", Internet, [Online], Feb. 12, 2002, http://www.w3.org/TR/2002/REC-xmldsig-core-20020212.

XP-009068483, Phelps T A et al., "Toward Active, Extensible, Networked Documents: Multivalent Architecture and Applications", Proceedings of the CM International Conference on Digital Libraries, vol. 1, Mar. 20, 21996, pp. 100-108.

XP-002515125, Cleveland G., "Overview of Document Management Technology", Internet, [Online], Jun. 1995, pp. 1-8, http://www.ifla.org/VI/5/op/udtop2/udt-op2.pdf.

Wenbo, X., et al., "Parsing XML Document", School of Information & Control of Wuxi Light Industry Wuxi, 21 4036 (translation included).

Hou, Y., et al., "Using SOAP Technology in Document Management System," Faculty of Computer, Guangdong University of Technology, Gunagzhou 510090, China; 2.Limited Liability Corporation, Shengli, Oil Field Dongyin 25737, China, 2004 (translation included).

Chen, C.B., et al., "Study on XML—Based report Technique with Browser/Server Mode," College of Computer, Huazhong University of Science and Technology, Wuhan Hubei 430074, China (translation included).

MSDN Training: :Module 6: Manipulating XML Data on the Client Using DOM, pp. 1-73, 2001.

* cited by examiner

METHOD OF HIERARCHICAL PROCESSING OF A DOCUMENT AND SYSTEM THEREFOR

CROSS-REFERENCE TO RELATED APPLICATIONS

This application is a continuation of International Application No. PCT/CN2006/003295 (filed Dec. 5, 2006), which claims priority to Chinese Application No. 200510126683.6 (filed Dec. 5, 2005) and 200510131641.1 (filed Dec. 12, 2005), the contents of which are incorporated herein by reference. The present application also relates to concurrently-filed U.S. patent application 12/133,290, which claims the priority of International Application No. PCT/CN2006/003293 (filed Dec. 4, 2006); concurrently-filed U.S. patent application 12/133,296, which claims the priority of International Application No. PCT/CN2006/003297 (filed Dec. 5, 2006); concurrently-filed U.S. patent application 12/133,280, which claims the priority of International Application No. PCT/CN2006/003296 (filed Dec. 5, 2006); and concurrently-filed U.S. patent application 12/133,309, which claims the priority of International Application No. PCT/CN2006/003294 (filed Dec. 5, 2006), the entire contents of which are incorporated herein by reference.

FIELD OF THE INVENTION

The present invention relates to document processing technologies, and particularly to a method and system for processing a document on layers.

BACKGROUND OF THE INVENTION

Information can be generally divided into structured data and unstructured data, and according to statistics, unstructured data mainly including text documents and streaming media constitute more than 70% of the information. The structure of structured data, i.e., a two-dimensional table structure, is comparatively simple. Structured data are typically processed by a database management system (DBMS). Such technique has been under development since the 1970s and was flourishing in the 1990s; the research and development and application of the technique for processing structured data are quite advanced at present. Unstructured data do not have any fixed data structure; hence unstructured data processing is very complicated.

Various of unstructured document processing applications are popular among users and different document formats are used at present, for example, existing document editing applications include Microsoft Word, WPS, Yongzhong Office (a branch of Open Office), Red Office (another branch of Open Office), etc. Usually a contents management application has to handle 200 to 300 ever updating document formats, which causes great difficulty to application developers. The document interoperability, digital contents extraction and format compatibility are becoming the focus of the industry, and problems as follows need solutions:

(1) Documents are not universal.

Users can exchange documents processed with the same application, but cannot exchange documents processed with different applications, which causes information blockage.

(2) Access interfaces are not unified and data compatibility costs are highly.

Since the document formats provided by different document processing applications are not compatible with each other, a component of another application should be used for a document processing application to parse an incompatible document (if that another application provides a corresponding interface) or too many research resources are spent in the software development stage to parse the document format from head to teo.

(3) Information security is poor.

The security control measures for a written document are quite limited, mainly including data encryption and password authentication, and widespread damages caused by information leaks in companies are found every year.

(4) Processes work only for a single document, multi-document management is lacking.

A person may have a large number of documents in his computer, but no efficient organization and management measure is provided for multiple documents and it is difficult to share resources such as font/typeface file, full text index, etc.

(5) Layer techniques are insufficient.

Some applications, e.g., Adobe Photoshop and Microsoft Word, have more or less introduced the concept of layer, yet functions and management of the layer are too rudimentary to meet the practical demands.

(6) Search methods are limited.

Massive information in the present networks results in a huge number of search results for any search keyword. While the full text search technique has solved the problem of recall ratio, precision ratio has become the major concern. However, the prior art does not fully utilize all information to improve the precision ratio. For example, the font or size of characters may be used for determining the importance of the characters, but both are ignored by the present search techniques.

Large companies are all working to make their own document format the standard format in the market and standardization organizations are also leaning toward the creation of a universal document format standard. Nevertheless, a document format, whether a proprietary document format (e.g., .doc format) or an open document format (e.g., .PDF format), leads to problems as follows:

(a) Repeated Research and Development and Inconsistent Performance

Different applications that adopt the same document format standard have to find their own ways to render and generate documents conforming with the document format standard, which results in repeated research and development. Furthermore, some rendering components developed by some applications provide full-scale functions while others provide only basic functions. Some applications support a new version of the document format standard while others only support an old version. Hence, different applications may present the same document in different page layouts, and rendering errors may even occur with some applications that are consequentially unable to open the document.

(b) Barrier to Innovation

The software industry is known for its ongoing innovation; however, when a new function is added, descriptive information about the function needs to be combined with the corresponding standard. A new format can only be introduced when the standard is revised. A fixed storage format makes technical innovation less competitive.

(c) Impaired Search Performance

For massive information, more indexes need to be added so as to enhance search performance, yet it is hard for a fixed storage format to allow more indexes.

(d) Impaired Transplantability and Scalability

Different applications in different system environments have different storage needs. For example, an application needs to reduce seek times of a disk head to improve performance when the data are saved in a hard disk, while an embedded application does not need to do that because the data of the embedded application are saved in the system memory. For example, a DBMS provided by the same manufacturer may use different storage formats on different platforms. Hence the document storage standards affect transplantability and scalability of the system.

In prior art, the document format that provides the best performance for openness and interchangeability is the PDF format from Adobe Acrobat. However, even though the PDF format has actually become a standard for document distribution and exchange worldwide, different applications cannot exchange PDF documents, i.e., PDF documents provides no interoperability. Moreover, both Adobe Acrobat and Microsoft Office can process only one document at a time and can neither manage multiple documents nor operate with docbases.

In addition, the existing techniques are significantly flawed concerning document information security. Currently, the most widely used documents, e.g., Word documents and PDF documents, adopt data encryption or password authentication for data security control without any systematic identity authentication mechanism. Privilege control cannot be applied to a part of a document but only to the whole document. The encryption and signature of logic data are limited, i.e., encryption and signature cannot be applied to arbitrary logic data. Likewise, a contents management system, while providing a satisfactory identity authentication mechanism, is separated from a document processing system and cannot be integrated with the document processing system on the core unit. Therefore the contents management system can only provide management down to the document level, and the document will be beyond the security control of the contents management system when the document is in use. Essential security control cannot be achieved in this way. And the security and document processing are usually handled by separated modules, which may easily cause security breaches.

SUMMARY OF THE INVENTION

The present invention provides a method and system for processing a document on layers.

A method for processing a document on layers, wherein the document being stored comprises at least one page, the method includes:

for each page in the document, dividing data of the page into multiple groups, wherein the multiple groups are taken as multiple layers respectively, and the multiple layers are arranged orderly;

managing and controlling the multiple layers respectively.

A system for processing a document on layers includes:

a first unit, adapted to store the document on pages;

a second unit, adapted to divide data of the page into multiple groups, wherein the multiple groups are taken as multiple layers respectively, and the multiple layers are arranged orderly; and a third unit, adapted to the multiple layers respectively.

A method for processing a document on layers, when an application is processing the document conforming to a universal document model via a docbase management system, includes:

inserting, when the document is edited by the application, a layer object into a page object of the document, and inserting a layout object into the layer object, wherein the layers in one page are arranged orderly; and by the docbase system, managing and controlling the layers respectively.

A docbase management system includes:

a first unit, adapted to insert, when the document is edited, a layer object into a page object of a document and a layout object into the layer object, wherein the layers in one page are arranged orderly; and a second unit, adapted to manage and control the layers respectively.

A document processing system includes:

an application layer, adapted to process a document conforming with a universal document model via a docbase management system;

a docbase management system, adapted to insert a layer object into a page object of the document and a layout object into the layer object when the document is edited by the application layer, wherein the layers in one page are arranged orderly; and adapted to manage and control the layers respectively.

A method for editing document data includes:

when an operation is performed according to an instruction indicating editing a document;

the operation adds new contents to the existing contents of the document without altering or deleting any of the existing contents.

The present invention differs by dividing a document processing application into an application layer and a docbase management system layer. The present invention further sets up an interface standard for interaction between the two layers and may even further create an interface layer conforming to the interface standard. The docbase management system is a universal technical platform with a broad range of document processing functions. An application issues an instruction to the docbase management system via the interface layer to process a document, and then the docbase management system performs a corresponding operation according to the instruction. In this way, as long as different applications and docbase management systems conform with the same standard, different applications can process the same document through the same docbase management system. Document interoperability is achieved as a result. Similarly, one application may process different documents through different docbase management systems without independent development on every document format.

The technical scheme of the present invention provides a universal document model that is compatible with documents to be processed by different applications. The interface standard is based on the document model so that different applications can process a document via the interface layer. The universal document model can be applied to all types of document formats so that one application may process documents in different formats via the interface layer.

The interface standard defines various instructions based on the universal document model for operations on corresponding documents and the method of issuing instructions by an application to a docbase management system(s). The docbase management system has functions to implement the instructions from the application.

The universal model includes multiple hierarchies such as a docset including a number of documents, a docbase and a document warehouse. The interface standard includes instructions covering the organizational management, query, and security control of multiple documents.

In the universal model, a page is separated into multiple layers from bottom to top and the interface standard includes instructions for operations on the layers, storage and extraction of a source file corresponding to a layer in a document.

In addition, the docbase management system has information security control functions for documents. For example, role-based fine-grained privilege management, and corresponding operation instructions are defined in the interface standard.

According to the present invention, the application layer and the data processing layer are separated with each other. An application no longer needs to deal with a specific document format directly and a document format is no longer associated with a specific application. Therefore, a document can be processed by different applications, an application can process documents in different formats, and document interoperability is achieved. The whole document processing system can further process multiple documents instead of one document. When a page in a document is divided into multiple layers, different management and control policies can be applied to different layers to facilitate operations of different applications on the same page (it can be designed so that different applications manage and maintain different layers) and further facilitate source file editing. Layers are also a good way to preserve the history of editing. A document processing technique based on separating the application layer and the data processing layer can integrate information security into the core unit of document processing. Security breaches will be eliminated, and the security mechanism and document processing mechanism will be combined into one module instead of two. More space is thus provided for security control and corresponding codes can thus be hidden deeper and used more effectively for defending illegal attacks and improving security and reliability. In addition, fine-grained security control measures can be taken, for example, more privilege classes and smaller management divisions can be adopted.

DETAILED DESCRIPTION OF THE INVENTION

The present invention is further described hereinafter in detail with reference to the accompanying drawings and embodiments. It should be understood that the embodiments described herein are used for purposes of explaining the present invention only and shall not be used for limiting the scope of the present invention.

The method and system for processing a document on layers provided by the present invention are mainly applied to a document processing system described hereinafter.

Figure 1:
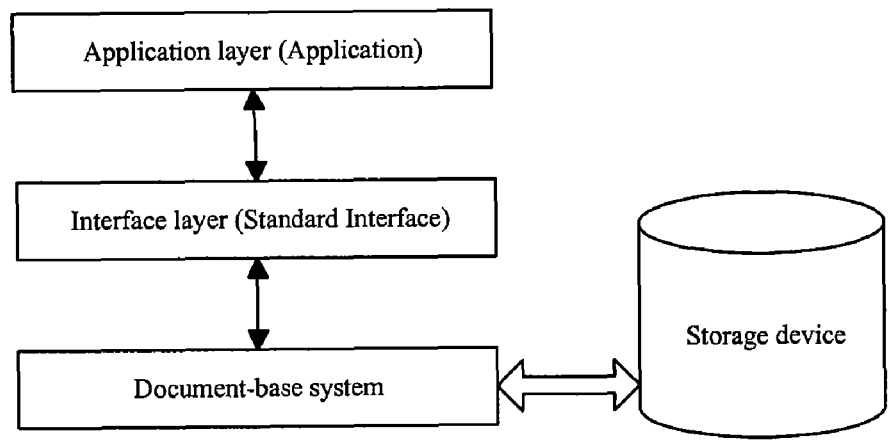
FIG. 1 is a block diagram of the structure of a document processing system in accordance with the present invention.

As shown in FIG. 1, the document processing system in accordance with the present invention includes an application, an interface layer, a docbase management system and a storage device.

The application includes any of the existing document processing and contents management applications in the application layer of the document processing system, and it sends an instruction conforming to the interface standard for operation on documents. All operations are applied on documents conforming to the universal document model regardless of the storage formats of the documents.

The interface layer conforms to the interface standard for interaction between the application layer and the docbase management system. The application layer sends a standard instruction to the docbase management system via the interface layer and the docbase management system returns the result of the corresponding operation to the application layer via the interface layer. It can be seen that, since all applications can sends a standard instruction via the interface layer to process a document conforming with the universal document model, different applications can process the same document through the same docbase management system and the same application can process documents in different formats through different docbase management systems.

Preferably, the interface layer includes an upper interface unit and a lower interface unit. The application can send a standard instruction from the upper interface unit to the lower interface unit, and the docbase management system receives the standard instruction from the lower interface unit. The lower interface unit is further used for returning the result of the operation performed by the docbase management system to the application through the upper interface unit. In practical applications, the upper interface unit can be set up in the application layer and the lower interface unit can be set up in the docbase management system.

The docbase management system is the core of the document processing system and performs an operation on a document according to a standard instruction from the application through the interface layer.

The storage device is the storage layer of the document processing system. A common storage device includes a hard disk or memory, and also can include a compact disc, flash memory, floppy disk, tape, remote storage device, or any kind of device that is capable of storing data. The storage device stores multiple documents. The method of storing the documents is irrelevant to the applications.

It can thus be seen that the present invention enables the application layer to be separated from the data processing layer in deed. Documents are no longer associated with any specified applications and an application no longer needs to deal with document formats. Therefore, different applications can edit the same document conforming to the universal document model and satisfactory document interoperability is achieved among the applications.

Universal Document Model

The universal document model can be defined with reference to the features of paper since paper has been the standard means of recording document information, and the functions of paper are sufficient to satisfy the practical needs in work and living.

If a page in a document is regarded as a piece of paper, all information put down on the paper should be recorded. There is a demand for the universal document model, which is able to describe all visible contents on the page. The page description language (e.g., PostScript) in the prior art is used for describing all information to be printed on the paper and will not be explained herein. However, the visible contents on the page can always be categorized into three classes: texts, graphics and images.

When the document uses a specific typeface or character, the corresponding font is embedded into the document to guarantee identical output on the screens/printers of different computers. The font resources are shared to improve storage efficiency, i.e., only one font needs to be embedded when the same character is used for different places. An image sometimes may be used in different places, e.g., the image may be used as the background images of all pages or as a frequently appearing company logo and it will be better to share the image, too.

Obviously, as a more advanced information process tool, the universal document model not only imitates paper, but also develops some enhanced digital features, such as metadata, navigation, a thread, and a thumbnail image, which also can be called minipage, etc. Metadata includes data used for describing data, e.g., the metadata of a book includes information about the author, publishing house, publishing date and ISBN. Metadata is a common term in the industry and will not be explained further herein. Navigation, also a common term in the industry, includes information similar to the table of contents of a book. The thread information describes the location of a passage and the order of reading, so that when a reader finishes a screen, the reader can learn what information should be displayed on the next screen. The thread also enables automatic column shift and automatic page shift without the reader manually appointing a position by the reader. The thumbnail image includes miniatures of all pages. The miniatures are generated in advance so that the reader may choose a page to read by checking the miniatures.

Figure 2:
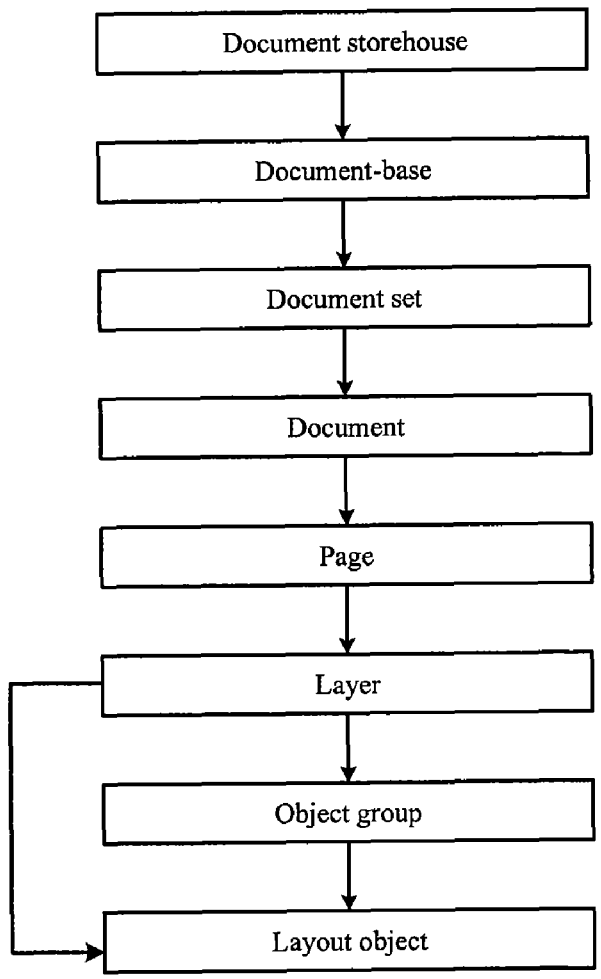
FIG. 2 shows the organizational structure of the universal document model in Preferred Embodiment of the present invention.

FIG. 2 shows a universal document model in a preferred embodiment of the present invention. As shown in FIG. 2, the universal document model includes multiple hierarchies including a document warehouse, docbase, docset, document, page, layer, object stream which also can be called object group, and layout object.

The document warehouse consists of one or multiple docbases. The relation among docbases is not as strictly regulated as the relation among hierarchies within a docbase. Docbases can be combined and separated simply without modifying the data of the docbases, and usually no unified index is set up for the docbases (especially a fulltext index), so most search operations on the document warehouse traverse the indexes of all the docbases without an available unified index. Every docbase consists of one or multiple docsets and every docset consists of one or multiple documents and possibly a random number of sub docsets. A document includes a normal document file (e.g., a .doc document) in the prior art. The universal document model may define that a document may belong to one docset only or belong to multiple docsets. A docbase is not a simple combination of multiple documents but a tight organization of the documents, which can create the great convenience after unified search indexes are established for the document contents.

Every document consists of one or multiple pages in an order (e.g., from the front to the back), and the size of the pages may be different. Rather than in a rectangular shape, a page may be in a random shape expressed by one or multiple closed curves.

Further, a page consists of one or multiple layers in an order (e.g., from the top to the bottom), and one layer is overlaid with another layer like one piece of glass over another piece of glass. A layer consists of a random number of layout objects and object streams. The layout objects include statuses (typeface, character size, color, ROP, etc.), texts (including symbols), graphics (line, curve, closed area filled with specified color, gradient color, etc.), images (TIF, JPEG, BMP, JBIG, etc.), semantic information (title start, title end, new line, etc.), source file, script, plug-in, embedded object, bookmark, hyperlink, streaming media, binary data stream, etc. One or multiple layout objects can form an object stream, and an object stream can include a random number of subobject streams.

The docbase, docset, document, page, and layer may further include metadata (e.g., name, time of latest modification, etc., the type of the metadata can be set according to practical needs) and/or history. The document may further include navigation information, thread information and thumbnail image. And the thumbnail image also may be placed in the page or the layer. The docbase, docset, document, page, layer, and object stream may also include digital signatures. The semantic information had better follow layout information to avoid data redundancy and to facilitate the establishment of the relation between the semantic information and the layout. The docbase and document may include shared resources such as a font and an image.

Further the universal document model may define one or multiple roles and grant certain privileges to the roles. The privileges are granted based on docbase, docset, document, page, layer, object stream and metadata etc. Regard docbase, docset, document, page, layer, object stream or metadata as a unit for granting privileges to a role, and the privileges define whether the role is authorized to read, write, copy or print the unit for granting.

The universal document model goes beyond the conventional one document for one file. A docbase includes multiple docsets, and a docset includes multiple documents. Fine-grained access and security control is applied to document contents in the docbase so that even a single text or rectangle can be accessed separately in the docbase while the prior document management system is limited to access as far as a file name, i.e., the prior document management system can not access to contexts of a file separately.

FIGS. 3 to 9 are schematics illustrating the organizational structures of various objects in the universal document model of preferred embodiment 1 of the present invention. The organization structures of the objects are tree structures and are divided into levels.

The document warehouse object consists of one or multiple docbase objects (not shown in the drawings).

Figure 3:
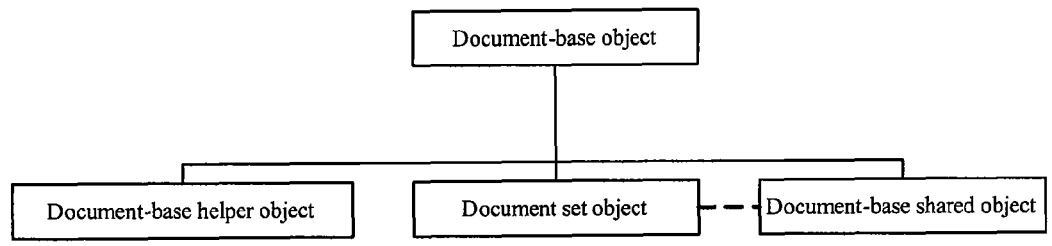
FIG. 3 shows the organizational structure of the docbase object in the universal document model shown in FIG. 2.

As shown in FIG. 3, the docbase object includes one or multiple docset objects, a random number of docbase helper objects, and a random number of docbase shared objects.

Figure 4:
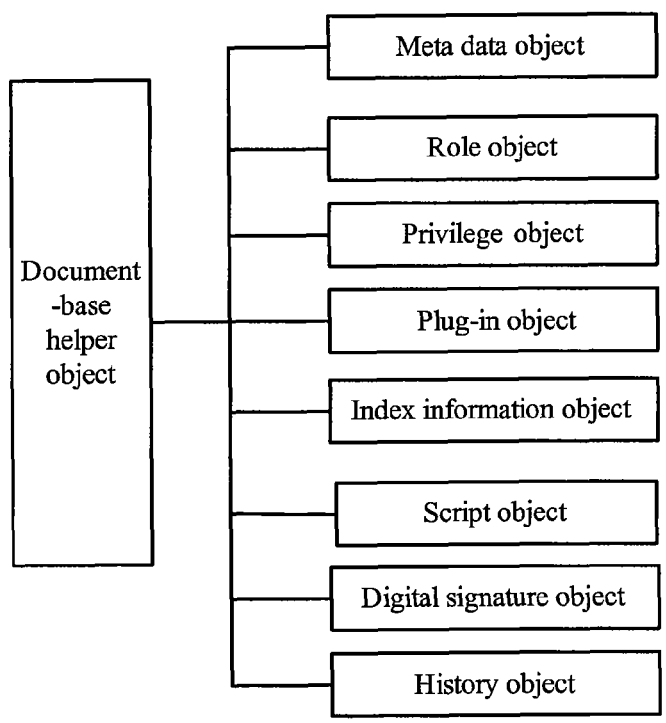
FIG. 4 shows the organizational structure of the docbase helper object in the docbase object shown in FIG. 3.

As shown in FIG. 4, the docbase helper object includes a metadata object, role object, privilege object, plug-in object, index information object, script object, digital signature object, and history object, etc. The docbase shared object includes an object that may be shared among different documents in the docbase, such as a font object and an image object.

Figure 5:
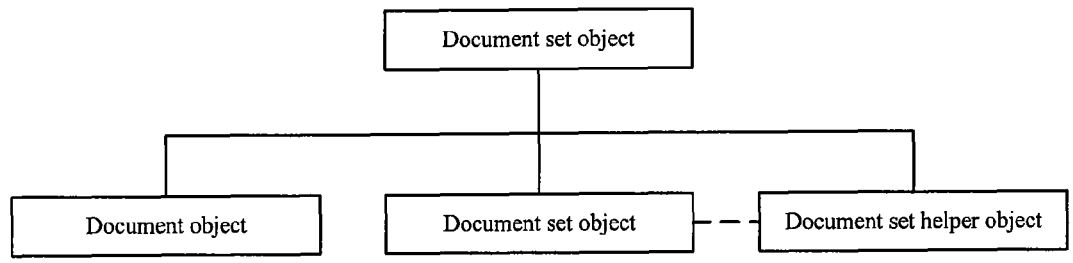
FIG. 5 shows the organizational structure of the docset object in the docbase object shown in FIG. 3.

As shown in FIG. 5, every docset object includes one or multiple document objects, a random number of docset objects, and a random number of docset helper objects. The docset helper object includes a metadata object, digital signature object, and history object. When the docset object includes multiple docset objects, the structure is similar to the structure of a folder including multiple folders in the Windows system.

Figure 6:
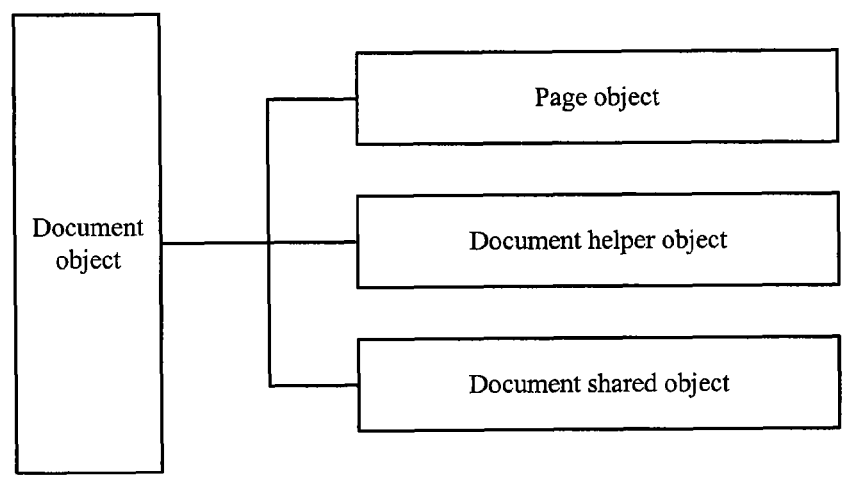
FIG. 6 shows the organizational structure of the document object in the docset object shown in FIG. 5.

As shown in FIG. 6, every document object includes one or multiple page objects, a random number of document helper objects, and a random number of document shared objects. The document helper object includes a metadata object, font object, navigation object, thread object, thumbnail image object, digital signature object, and history object. The document shared object includes an object that may be shared by different pages in the document, such as an image object and a seal object.

Figure 7:
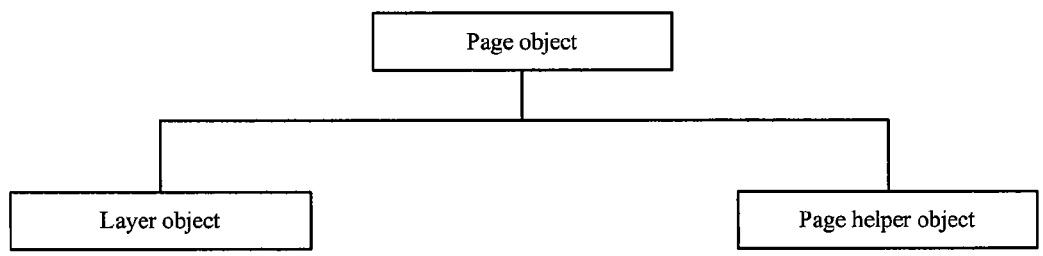
FIG. 7 shows the organizational structure of the page object in the document object shown in FIG. 6.

As shown in FIG. 7, every page object includes one or multiple layer objects and a random number of page helper objects. The page helper object includes a metadata object, digital signature object and history object.

Figure 8:
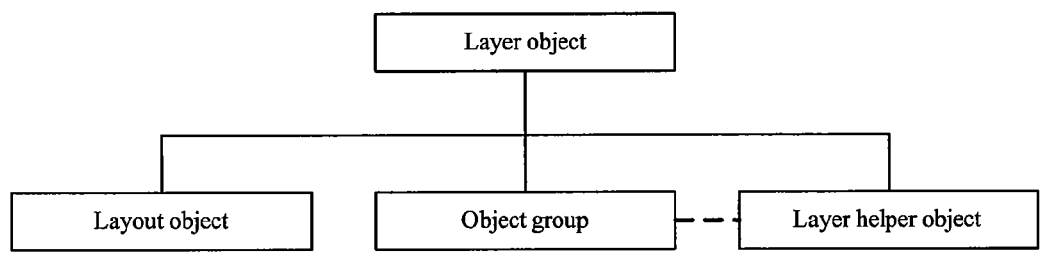
FIG. 8 shows the organizational structure of the layer object in the page object shown in FIG. 7.

As shown in FIG. 8, every layer object includes one or multiple layout objects, a random number of object streams and a random number of layer shared objects. The layer helper object includes a metadata object, digital signature object, and history object. The object stream includes a random number of layout objects, a random number of object streams, and optional digital signature objects. When the object stream includes multiple object streams, the structure is similar to the structure of a folder including multiple folders in the Windows system.

Figure 9:
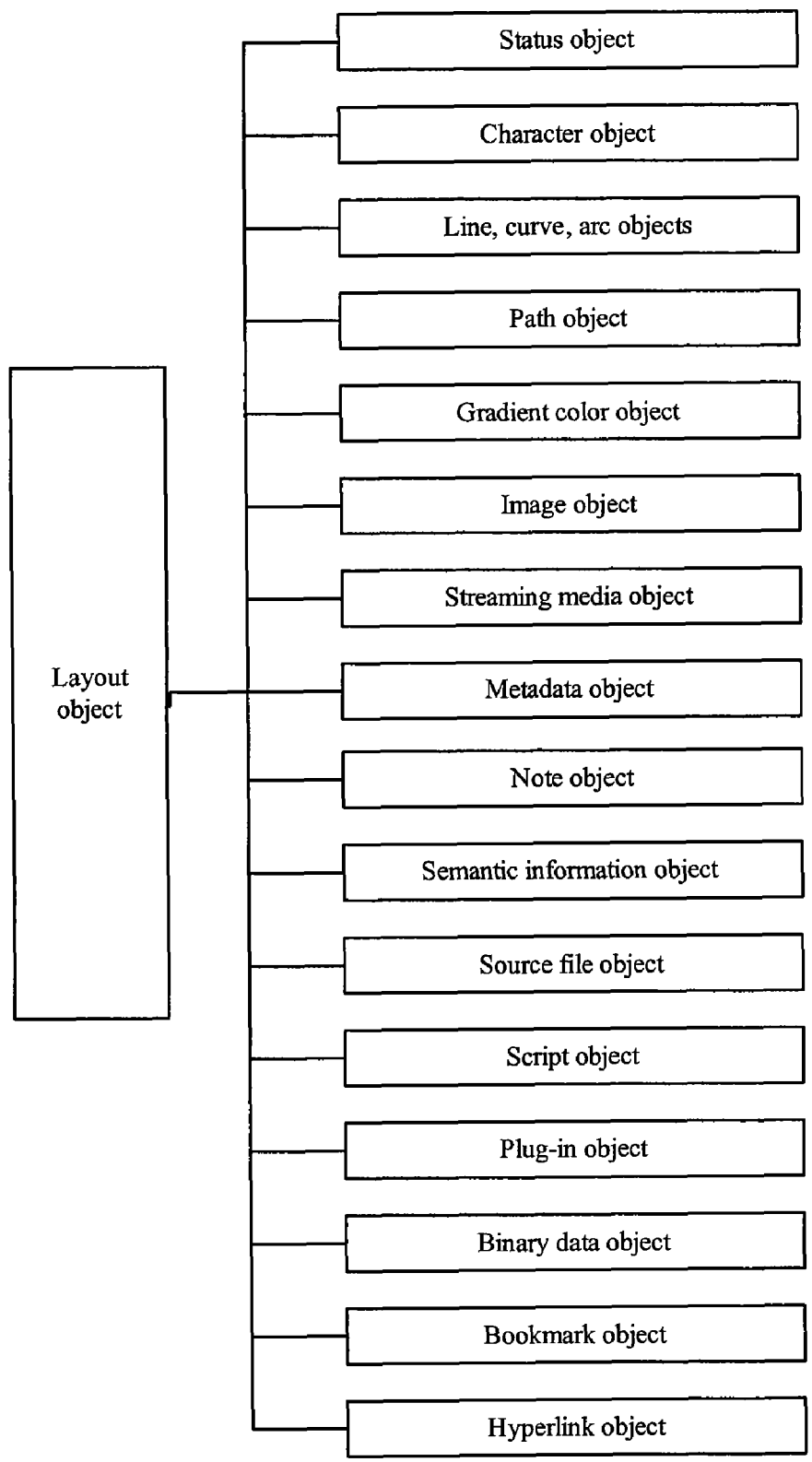
FIG. 9 shows the organizational structure of the layout object in the layer object shown in FIG. 8.

As shown in FIG. 9, the layout object includes any one or any combination of a status object, text object, line object, curve object, arc object, path object, gradient color object, image object, streaming media object, metadata object, note object, semantic information object, source file object, script object, plug-in object, binary data stream object, bookmark object, and hyperlink object.

Further, the status object includes any one or any combination of a character set object, typeface object, character size object, text color object, raster operation object, background color object, line color object, fill color object, linetype object, line width object, line joint object, brush object, shadow object, shadow color object, rotate object, outline typeface object, stroke typeface object, transparent object, and render object.

The universal document model can be enhanced or simplified based on the above description. If a simplified document model does not include a docset object, the docbase object shall include a document object directly. And if a simplified document model does not include a layer object, the page object shall include a layout object directly.

One skilled in the art can understand that a minimum universal document model includes only a document object, page object and layout object. The layout object includes only a text object, line object and image object. The models between a full model and the minimum model are included in the equivalents of the preferred embodiments of the present invention.

Universal Security Model

A universal security model should be defined to satisfy the document security requirements, enhance the document security function of the present applications and eliminate security breaches caused by separation of the security management mechanism and document processing module. In a preferred embodiment of the present invention, the universal document security model includes aspects as follows:

1. Role Object

A number of roles in a docbase and the role objects are subobjects of the docbase object. When corresponding universal document model does not include a docbase object, the role shall be defined in a document, i.e., the role object shall be the subobject of a document object and the docbase in the universal document security model shall be replaced with a document.

2. Grant an Access Privilege to a Specified Role

An access privilege can be granted to any role on any object (e.g. a docbase object, docset object, document object, page object, layer object, object stream object and layout object). If a privilege on an object is granted to a role, the privilege can be inherited by all direct or indirect subobjects of the object.

Access privileges in the docbase management system may include any one or any combination of the following privileges on objects: read privilege, write privilege, re-license privilege (i.e., granting part of or all the privileges of itself to another role), and bereave privilege (i.e., deleting part of or all the privileges of another role). However, the privileges provided by the present invention are not limited to any one or any combinations of the privileges described above. Other privileges that may be incorporated into an application can also be defined, e.g., print privilege.

3. A Role Sign an Object

A role can sign an arbitrary object to obtain a signature. The signature covers the subobjects of the object and objects referenced by the object.

4. Create a Role

A key of a role used for the login process is returned in response to an instruction of creating a role object. The key is usually a private key of the PKI key pair and should be kept securely by the application. The key also can be a login password. Preferably, all applications are allowed to create a new role to which no privilege is granted. Certain privileges can be granted to the new role by an existing role with re-license privilege.

5. Login of Role

When an application logs in as a role, the "challenge-response" mechanism can be employed, i.e., the docbase management system encrypts a random data block with the public key of the role and sends the cipher data to the application, the application decrypts the cipher data and returns the decrypted data to the docbase management system. If the data are correctly decrypted, it is determined that the application does have the private key of the role (the "challenge-response" authentication process may be repeated several times for double-check). The "challenge-response" mechanism may also include processes as follows: The docbase management system sends a random data block to the application; the application encrypts the data with the private key and returns the cipher data to the docbase management system, and the docbase management system decrypts the cipher data with the public key. If the data are correctly decrypted, it is determined that the application does have the private key of the role. The "challenge-response" mechanism provides better security for the private key. When the key of the role is a login password, users of the application have to enter the correct login password.

In addition, the application may log in as multiple roles. The privileges granted to the application are the combination of the privileges of the roles.

6. A Default Role

A special default role can be created. When a default role is created, the corresponding docbase can be processed with the default role even when no other role logs in. Preferably, a docbase creates a default role with all possible privileges when the docbase is created.

Practically, the universal security model can be modified into an enhanced, simplified, or combined process, and the modified universal security model is included in the equivalents of the embodiments of the present invention.

Interface Layer

A unified interface standard for the interface layer can be defined based on the universal document model, universal security model and common document operations. The interface standard is used for sending an instruction used for processing an object in the universal document model. The instruction used for processing an object in the universal document model conforms with the interface standard so that different applications may issue standard instructions via the interface layer.

The application of the interface standard is explained hereinafter. The interface standard can be performed through processes as follows: The upper interface unit generates an instruction string according to a predetermined standard format, e.g., "<UOML_INSERT (OBJ=PAGE, PARENT=123.456.789, POS=3)/>", and sends the instruction to the lower interface unit. It then receives the operation result of the instruction or other feedback information from the docbase management system via the lower interface unit. Or the interface standard can be performed through processes as follows: The lower interface unit provides a number of interface functions with standard names and parameters, e.g., "BOOL UOI_InsertPage (UOI_Doc*pDoc, int nPage)", the upper interface unit invokes these standard functions, and the action of invoking functions is equal to issuing standard instructions. Or the above two processes can be combined to perform the interface standard.

The interface standard applies an "operation action+object to be operated" approach so that the interface standard will be easy to study and understand and be more stable. For example, when 10 operations need to be performed on 20 objects, the standard can either define 20×10=200 instructions or define 20 objects and 10 actions. However, the method for the latter definition puts far less burden on human memory and makes it easy to add an object or action when the interface standard is extended in the future. The object to be operated is an object in the universal document model.

For example, the following 7 operation actions can be defined:

Open: create or open a docbase;
Close: close a session handle or a docbase;
Get: get an object list, object related attribute, and data;
Set: set/modify object data;
Insert: insert a specified object or data;
Delete: delete a subobject of an object; and
Query: search for contents in document(s) according to a specified term, wherein the term may include accurate information or vague information, i.e., a fuzzy search is supported.

The following objects can be defined: a docbase, docset, document, page, layer, object stream, text, image, graphic, path (a group of closed or open graphics in an order), source file, script, plug-in, audio, video, role, etc.

The objects to be defined may also include the following status objects: background color, line color, fill color, line style, line width, ROP, brush, shadow, shadow color, character height, character width, rotate, transparent, render mode, etc.

When the interface standard applies the "operation action+object to be operated" approach, it cannot be automatically assumed that each combination of each object plus each action gives a meaningful operation instruction. Some combinations are just meaningless.

The interface standard may also be defined by using a function approach that is not an "operation action+object to be operated" approach. For example, an interface function is defined for each operation on each object, and in such a case every operation instruction is sent to the docbase management system by the upper interface unit invoking the corresponding interface function of the lower interface unit.

The interface standard may also encapsulate various object classes of Object Oriented Programming language, e.g., a docbase class, and define an operation to be performed on the object as a method of the class.

Particularly, when an instruction of getting a page bitmap is defined in the interface standard, it will be crucial to layout consistency and document interoperability.

By using the instruction of getting page bitmap, the application can get the page bitmap of a specified bitmap format of a specified page, i.e., the screen output of the page can be shown in a bitmap without rendering every layout object on the application' own. That means the application can directly get accurate page bitmap to display/print a document without parsing every layout object on every layer in every page one by one, rendering every object or displaying the rendering result of every object on page layout. When the application has to render the objects itself, in practical some applications may render the objects comparatively full and accurately while other applications rendering the objects partially or inaccurately, hence different applications may produce different screen display/print outputs for a same document, which impairs document interoperability among the applications. By generating page bitmap by the docbase management system, the keypoint to keeping consistent page layout is transferred from the application to the docbase management system, which makes it possible for different applications to produce identical page output for a same document. The docbase management system can provide such a function because: firstly, the docbase management system is a unified basic technical platform and is able to render various layout objects while it will be hard for an application to render all layout objects; secondly, different applications may cooperate with a same docbase management system to further guarantee consistent layouts in screen display/print outputs. To sum up, it is unlikely for different applications to produce identical output for a same document while it is possible for different docbase management systems to produce identical output for a same document, and a same docbase management system will definitely produces identical output for a same document. Therefore the task of generating page bitmaps is transferred from the application to the docbase management system, and it is an easy way to keep consistent page bitmap among different applications for a same document.

Furthermore, the instruction of getting page bitmap may target a specified area on a page, i.e., request to show only an area of a page. For example, when the page is larger than the screen, the whole page needs not to be shown, and while scrolling the page only the scrolled area needs to be repainted. The instruction may also allow getting a page bitmap constituted of specified layers, especially a page bitmap constituted of a specified layer and all layers beneath the specified layer, such bitmaps will perfectly show history of the page, i.e., shows what the page looks like before the specified layer is added. If required, the instruction can specify the layers to be included in page bitmaps and the layers to be excluded from the page bitmaps.

More search patterns besides the conventional keyword search can be offered by the query instruction. According to conventional search techniques, the functions of search and document processing are separated; therefore, the search program can extract from the document merely the plain text information without any additional information and the query action is based only on the text information. In the present invention, however, the search function is integrated into the core unit of the document processing system, i.e., into the docbase management system, therefore, a more powerful search pattern can be provided by fully utilizing information in documents.

1. The search may be based on character font, for example, search for "sursen" in font Arial or search for "sursen" in font Times New Roman.

2. The search may be based on character size, for example, search for "sursen" in size 3, or search for "sursen" in any size larger than 20 points, or search for "sursen" in heightened size (i.e., character height being larger than the character width).

3. The search may be based on character color, for example, search for "sursen" in red or search for "sursen" in blue.

4. The search may be based on layout position, for example, search for "sursen" in the upper part of a page, or search for "sursen" in the footers.

5. The search may be based on special character embellishment, for example, search for "sursen" in italic typeface, or search for "sursen" that is rotated clockwise by 30-90 degrees, or search for "SEP" in outline typeface, or search for "docbase" in stroke typeface.

6. Similarly, the search can be provided based on other conditions, such as search for "sursen" in reverse color (i.e., a white character on a black background), search for "sursen" that is overlapped on an image, etc.

7. The combinations of multiple layout objects can also be searched, e.g., search for "shusheng" and "sursen" when the two strings are no more than 5 cm apart.

8. The search can be based on any combination of the above conditions.

An embodiment of the interface standard in the "operation action+object to be operated" approach is described hereinafter. In the embodiment, the interface adopts the Unstructured Operation Markup Language (UOML), which provides an instruction in the Extensible Markup Language (XML). Every action corresponds to a XML element and every object also corresponds to a XML element. The upper interface generates a string confirming with UOML, and sends an operating instruction to the docbase management system by sending the string to the lower interface unit. The docbase management system executes the instruction, the lower interface unit generates another string in the UOML format according to the result of the operation in accordance with the instruction, and the string is returned to the upper interface unit so that the application will learn the result of the operation in accordance with the instruction.

The result is expressed in UOML_RET, and the definitions adapted in the UOML_RET include items as follows:

Attributes
SUCCESS: "true" indicating the successful operation and otherwise indicating the failing operation.
Sub-Elements
ERR_INFO: optional, appearing only when the operation fails and used for describing corresponding error information.
Other sub-elements: defined based on different instructions, checking description of the instructions for reference.

Figure 11:
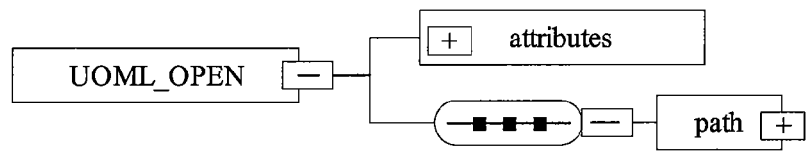
FIG. 11 shows the definition structure of the creating or opening action given by the interface layer.

UOML actions include items as follows:
1. UOML_OPEN Create or open a docbase as shown in FIG. 11
  1.1 Attributes
   1.1.1 create: "true" indicating creating a new docbase and otherwise indicating opening an existing docbase.
  1.2 Sub-elements
   1.2.1 path: a docbase path. It can be the name of a file in a disk, or a URL, or a memory pointer, or a network path, or the logic name of a docbase, or another expression that points to a docbase.

Strings with different features can be used for distinguishing different types of path, so the docbase can be specified with different means by setting different features for the string without modifying the instruction format. For example, the disk file name begins with an equipment name (e.g., a drive) and ":" (e.g., "C:", "D:") and neither "//" nor another ":" is on the neck of equipment name and ":"; the URL begins with a protocol name and "://" (e.g., "http://"); the memory point begins with "MEM::" and continues with a string indicating the pointer, e.g., "MEM::1234:5678"; the network path begins with "\\" and continues with a server name and a path on the server, e.g., "\\server\abc\def.sep"; the logical name of the docbase may begin with "*", e.g., "*MyDocBase1".

When the lower interface unit parses the string of the path, the lower interface unit decides that the string indicates the logical name of a docbase when the first character of the string is "*", or indicates a network path when the first two characters of the string are "\\", or indicates a memory pointer when the first five characters of the string are "MEM::"; or the lower interface unit searches for the first ":" in the string and decides that the string indicates a URL when "//" follows the ":"; otherwise the string shall be regarded as a path to a local file. When a docbase on a server is opened, a special URL protocol can be defined for the purpose, e.g., a string "Docbase://myserver/mydoc2" is used for instructing to open the docbase named mydoc2 which is managed by a docbase management system on a server named myserver.

In summary, different features can be set for a string to specify a docbase in different ways. Different string features may be defined not only to indicate a docbase path or but also to be applied in other situations, especially to indicate the location of special resources. In many cases, it is anticipated that a new method can be used for indicating corresponding resources without modifying existing protocols or functions; hence the different features of the string can be used for indicating different resources. This method is the most universal one since all protocols and functions that support the disk file name or URL support the string.

Figure 12:
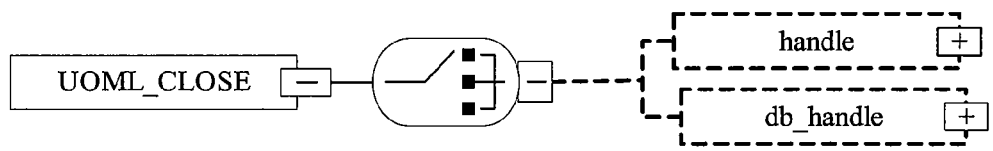
FIG. 12 shows the definition structure of the closing action given by the interface layer.
Figure 13:
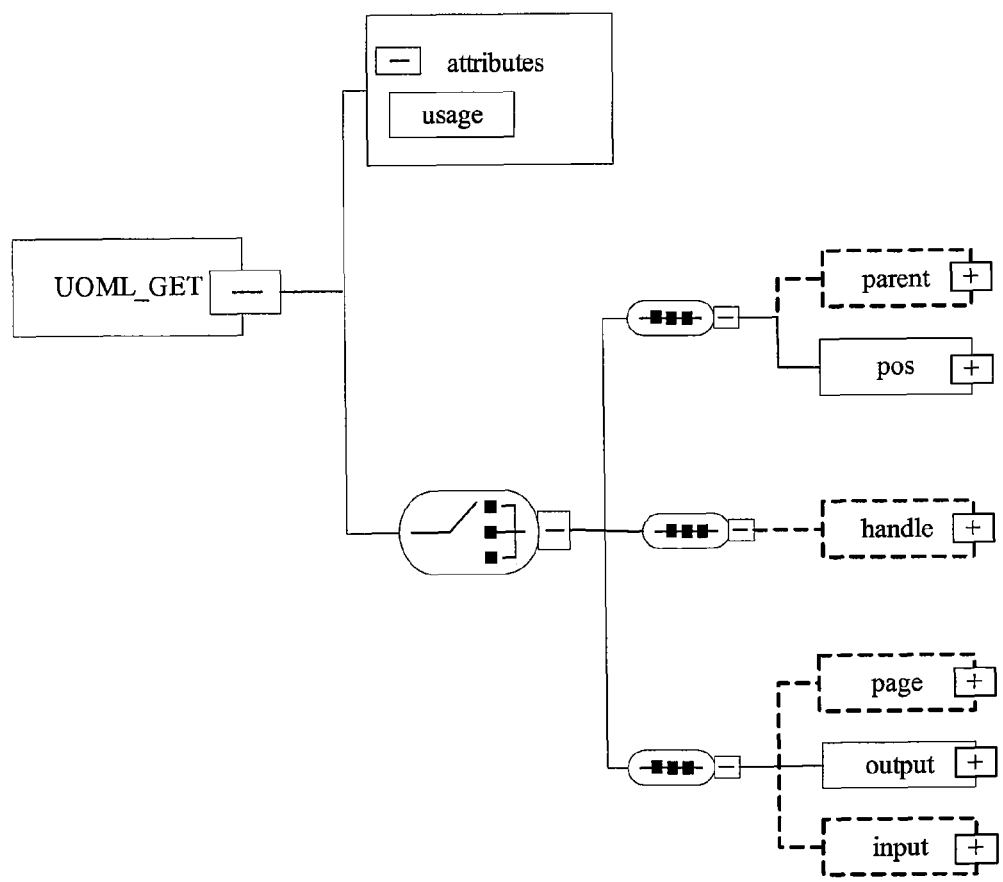
FIG. 13 shows the definition structure of the getting action given by the interface layer.

1.3 Return values
   When the operation succeeds, a sub-element "handle" is added into the UOML_RET to record the handle.
2. UOML_CLOSE Close as shown in FIG. 12
  2.1 Attributes: N/A
  2.2 Sub-elements
   2.2.1 handle: an object handle, a pointer index of the object denoted by a string.
   2.2.2 db_handle: a docbase handle, a pointer index of the docbase denoted by a string.
  2.3 Return values: N/A
3. UOML_GET Get as shown in FIG. 13
  3.1 Attributes
   usage: any one of "GetHandle" (get the handle of a specified object), "GetObj" (get the data of a specified object), and "GetPageBmp" (get a page bitmap).

3.2 Sub-elements 3.2.1 parent: the handle of the parent object of an object, used only when the attribute "usage" contains a value for "GetHandle".

3.2.2 pos: a position number, used only when the attribute "usage" contains a value for "GetHandle".

3.2.3 handle: the handle of a specified object, used only when the attribute "usage" contains a value for "GetObj".

3.2.4 page: the handle of the page to be displayed, used only when the attribute "usage" contains a value for "GetPageBmp".

3.2.5 input: describing the requirements for an input page, e.g., requiring to display the contents of a layer or multiple layers (the present logged role must have the privilege to access the layer(s) to be displayed), or specifying the size of the area to be displayed by specifying the clip area, used only when the attribute "usage" contains a value for "GetPageBmp".

3.2.6 output: describing the output of a page bitmap, used only when the attribute "usage" contains a value for "GetPageBmp".

3.3 Return values 3.3.1 When the attribute "usage" contains a value for "GetHandle" and the operation on the object succeeds, a sub-element "handle" is added into the UOML_RET to record the handle of the pos$^{th}$ subobject of the parent object.

3.3.2 When the attribute "usage" contains a value for "GetObj" and the operation on the object succeeds, a sub-element "xobj" is added into the UOML_RET to record the XML expression of the data that includes the handle object.

3.3.3 When the attribute "usage" contains a value for "GetPageBmp" and the operation on the object succeeds, a location is specified in the "output" sub-element to export a page bitmap.

Figure 14:
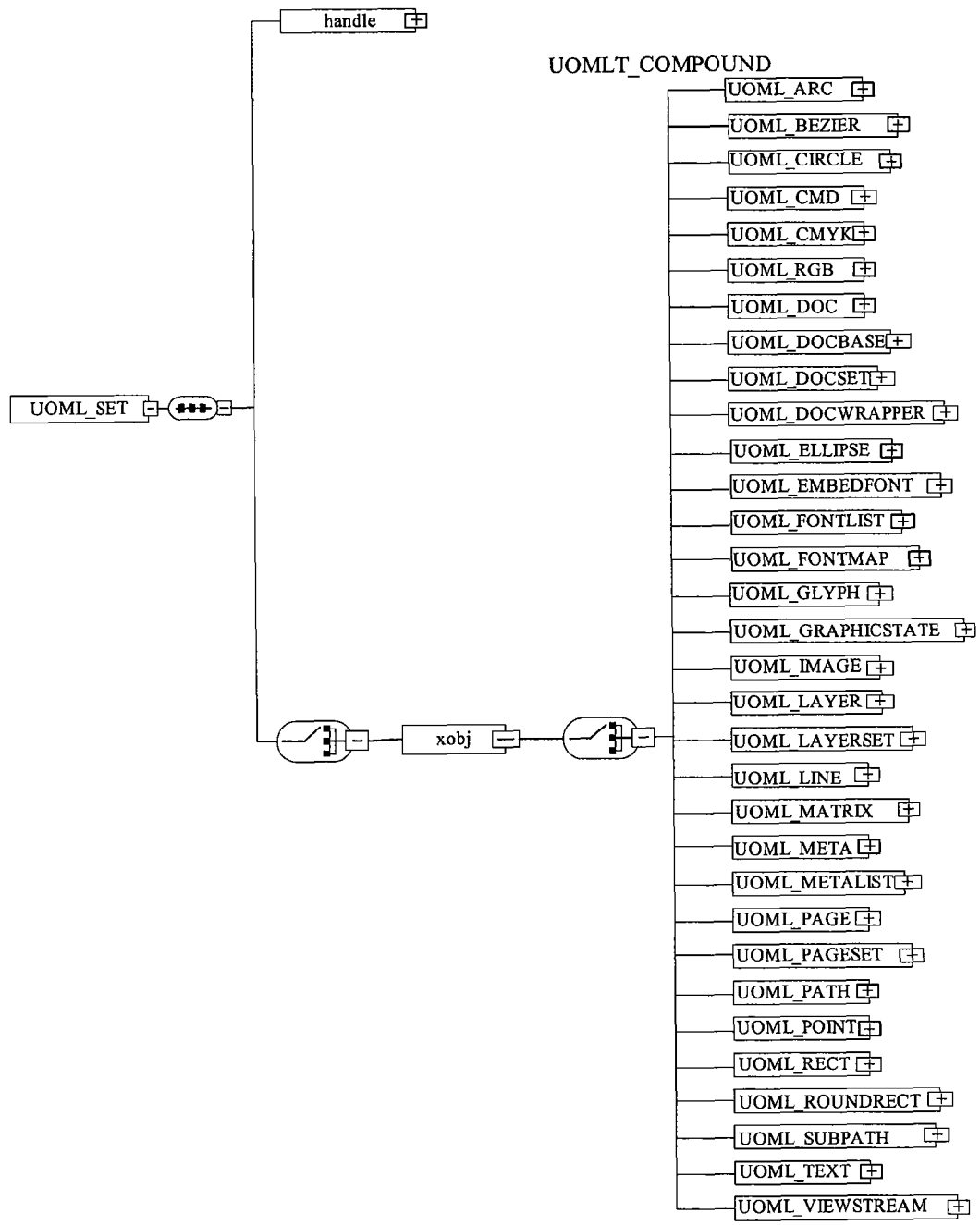
FIG. 14 shows the definition structure of the setting action given by the interface layer.

4 UOML_SET Set as shown in FIG. 14

4.1 Attributes: N/A 4.2 Sub-elements 4.2.1 handle: setting an object handle 4.2.2 xobj: description of an object;

4.3 Return values: N/A

Figure 15:
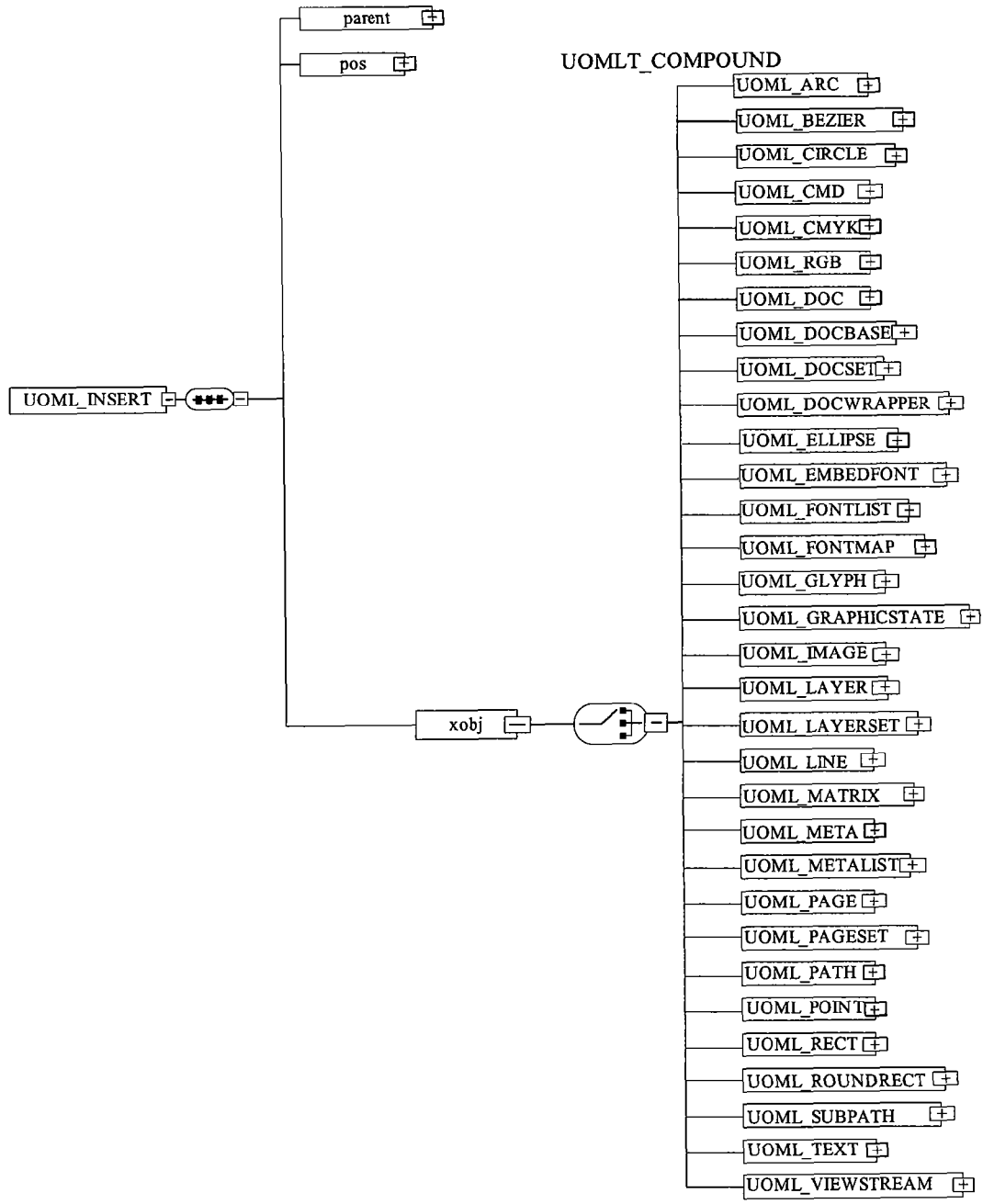
FIG. 15 shows the definition structure of the inserting action given by the interface layer.

5 UOML_INSERT Insert as shown in FIG. 15

5.1 Attributes: N/A 5.2 Sub-elements 5.2.1 parent: the handle of a parent object 5.2.2 xobj: description of an object 5.2.3 pos: the position of the inserted object 5.3 Return values When the operation on an object succeeds, the object indicated by the "xobj" parameter is inserted into the parent object as the pos$^{th}$ subobject of the parent object and a "handle" sub-element is included in the UOML_RET to indicate the handle of the newly inserted object.

Figure 16:
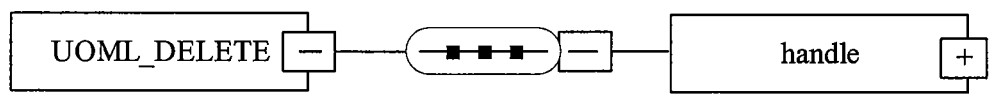
FIG. 16 shows the definition structure of the deleting action given by the interface layer.

6. UOML_DELETE Delete as shown in FIG. 16

Figure 17:
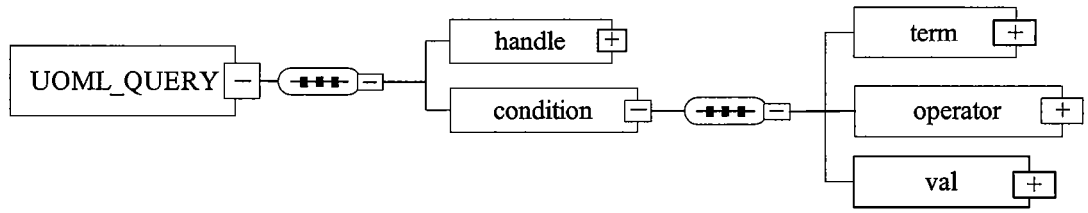
FIG. 17 shows the definition structure of the querying action given by the interface layer.

6.1 Attributes: N/A 6.2 Sub-elements 6.2.1 handle: the handle of the object to be deleted 6.3 Return values: N/A 7. UOML_QUERY Search as shown in FIG. 17

7.1 Attributes: N/A 7.2 Sub-elements 7.2.1 handle: the handle of the docbase to be searched for 7.2.2 condition: search terms 7.3 Return values When the operation succeeds, a "handle" sub-element is included in the UOML_RET to indicate the handle of the search results, a "number" sub-element indicates the number of the search results, and UOML_GET can be used for getting each search result.

UOML objects include a docbase (UOML_DOCBASE), a docset (UOML_DOCSET), a document (UOML_DOC), a page (UOML_PAGE), a layer (UOML_LAYER), an object stream (UOML_OBJGROUP), a text (UOML_TEXT), an image (UOML_IMAGE), a line (UOML_LINE), a curve (UOML_BEIZER), an arc (UOML_ARC), a path (UOML_PATH), a source file (UOML_SRCFILE), a background color (UOML_BACKCOLOR), a foreground color (UOML_COLOR), a ROP(UOML_ROP), a character size (UOML_CHARSIZE) and a typeface (UOML_TYPEFACE).

The method for defining the objects is explained hereafter with reference to part of objects as follows.

1 UOML_DOC 1.1 Attributes: N/A 1.2 Sub-elements 1.2.1 metadata: metadata 1.2.2 pageset: pages 1.2.3 fontinfo: an embedded font 1.2.4 navigation: navigation information 1.2.5 thread: thread information 1.2.6 minipage: thumbnail image 1.2.7 signature: a digital signature 1.2.8 log: history 1.2.9 shareobj: shared objects in the document

2 UOML_PAGE 2.1 Attributes 2.1.1 resolution: logical resolution 2.1.2 size: size of the page, including a width value and a height value 2.1.3 rotation: rotation angle 2.1.4 log: history 2.2 Sub-elements 2.2.1 gs: initial graphic statuses, including charstyle (character style), linestyle (line style), linecap (line cap style), linejoint (line joint style), linewidth (line width), fillrule (rule for filling), charspace (character space), linespace (line space), charroate (character rotation angle), charslant (character slant direction), charweight (character weight), chardirect (character direction), textdirect (text direction), shadowwidth (shadow width), shadowdirect (shadow direction), shadowboderwidth (shadow border width), outlinewidth (outline width), outlineboderwidth (outline border width), linecolor (line color), fillcolor (color for filling), backcolor (background color), textcolor (text color), shadowcolor (shadow color), outlinecolor (outline color), matrix (transform matrix) and cliparea (clip area)

2.2.2 metadata: metadata 2.2.3 layerset: layers of the page 2.2.4 signiture: digital signature 2.2.5 log: history

3. UOML_TEXT 3.1 Attributes:

3.1.1 encoding: encoding pattern of text 3.2 Sub-elements 3.2.1 textdata: contents of the text 3.2.2 charspacinglist: a spacing value list for characters with irregular space 3.2.3 startpos: the starting position

4 UOML_CHARSIZE 4.1 Attributes 4.1.1 width: character width 4.1.2 height: character height 4.2 Sub-elements: N/A 5 UOML_LINE
5.1 Attributes
5.1.1 linestyle: line style
5.1.2 linecap: line cap style
5.2 Sub-elements
5.2.1 startpoint: the coordinate of the startpoint of the line
5.2.2 endpoint: the coordinate of the endpoint of the line
6. UOML_BEIZER
6.1 Attributes
6.1.1 linestyle: line style
6.2 Sub-elements
6.2.1 startpoint: the coordinate of the startpoint of a Bessel curve
6.2.2 control1_point: first control point of the Bessel curve
6.2.3 control2_point: second control point of the Bessel curve
6.2.4 endpoint: the coordinate of the endpoint of the Bessel curve
7. UOML_ARC
7.1 Attributes
7.1.1 clockwise: the direction of the arc
7.2 Sub-elements
7.2.1 startpoint: the coordinate of the startpoint of the arc
7.2.2 endpoint: the coordinate of the endpoint of the arc
7.2.3 center: the coordinate of the center of the arc
8. UOML_COLOR
8.1 Attributes
8.1.1 type: color type, i.e., RGB or CMYK
8.2 Sub-elements
RGB mode
8.2.1 red: red
8.2.2 green: green
8.2.3 blue: blue
8.2.4 alpha: transparency
CMYK mode
8.2.5 cyan: cyan
8.2.6 magenta: magenta
8.2.7 yellow: yellow
8.2.8 black_ink: black The definitions of the remaining UOML objects can be deduced from the above description. When the application requests an operation in the docbase management system, a corresponding UOML instruction is generated based on a corresponding UOML action and UOML object according to the XML grammar. Specifically, in the present invention, the action can be described as an XML element, the object can be described as a sub-element of the XML element of the action, a value can be described as a string and detailed information of the object can be described as an attribute. Therefore invoking a function and a returned result can be described by the XML. DTD or schema can be used for restricting the XML description semantically. After that, the UOML instruction regarded as an operation instruction is sent to a docbase management system. XML, a standard issued by W3C (World Wide Web Consortium) in February 1998, is a simplified subset of SGML (Standard Generalized Markup Language), just like HTML. The XML grammar and instructions for different object operations can refer to the W3C standard. Reference also includes "Extensible Markup Language (XML) 1.1, W3C Recommendation Feb. 4, 2004, edited in place 15 Apr., 2004", "W3C (World Wide Web Consortium) eXtensible Markup Language(XML) 1.0 (REC-xml-19980210)", "W3C XML Schema Part 0-4 (REC-xmlschema)", "W3C Namespaces in XML (REC-xml-names-199090114)", "W3C XSL Transformations (XSLT) Version 1.0 (REC-xslt-19991116)", "Document Object Model (DOM) Level 1 Specification (Second Edition) Version 1.0, W3C Working Draft Sep. 29, 2000", "US Federal CIO Council XML Working Group Draft Federal XML Developer's Guide" and "UK Office of the e-Envoy, e-Government Schema Guidelines for XML".

For example, the operation of creating a docbase can be initiated by the executing instruction:

```
<UOML_OPEN create="true">
    <path val="f:\\data\\docbase1.sep"/>
</UOML_OPEN>
```

And the operation of inserting a docset can be initiated by the executing instruction:

```
<UOML_INSERT >
    <parent val= "123.456.789"/>
    <pos val="1"/>
    <xobj>
        <docset/>
    </xobj>
</UOML_INSERT>
```

It should be noted that, although UOML is defined with XML, prefix expressions of standard XML format such as "<?xml version=" 1.0 "encoding="UTF-8"?>" and "xmlns:xsi="http://www.w3.org/2001/XMLSchema-instance"" are omitted to simplify the instructions; however, those familiar with XML may add the expressions at will.

The instructions may also be defined in a language other than the XML, e.g., the instructions can be constructed like PostScript, and in such a case the above examples of instructions will be changed into:

1, "f:\\datadocbase1.sep", /Open
/docset, 1, "123.456.789", /Insert

Instructions in other string formats may also be defined according to the same theory; the instructions may even be defined in a non-text binary format.

An embodiment in which every operation on every object can be expressed in an instruction is explained hereinafter. In this embodiment, inserting a docset can be indicated by "UOML_INSERT_DOCSET" and inserting a page can be indicated by "UOML_INSERT_PAGE". The definition details are as follows:

UOML_INSERT_DOCSET: used for inserting a docset in a docbase
Attributes: N/A
Sub-elements
parent: the handle of the docbase
pos: the position of the docset to be inserted
Return value: when the operation succeeds, a sub-element "handle" is included in the UOML_RET to indicate the handle of the newly inserted docset Therefore the instruction shall appear as follows:

```
<UOML_INSERT_DOCSET >
    <parent val="123.456.789"/>
    <pos val="1"/>
</UOML_INSERT_DOCSET >
```

However, such approach for defining instructions is inconvenient since every legal operation on every object needs an independent instruction.

An embodiment in which every operation on every object can be expressed in an instruction is explained hereinafter. In this embodiment, inserting a docset can be indicated by "UOML_INSERT_DOCSET" and inserting a page can be indicated by "UOML_INSERT_PAGE". The definition details are as follows:

UOML_INSERT_DOCSET: used for inserting a docset in a docbase

Attributes: N/A

Sub-elements parent: the handle of the docbase pos: the position of the docset to be inserted Return value: when the operation succeeds, a sub-element "handle" is included in the UOML_RET to indicate the handle of the newly inserted docset Therefore the instruction shall appear as follows:

```
<UOML_INSERT_DOCSET>
    <parent val="123.456.789"/>
    <pos val="1"/>
</UOML_INSERT_DOCSET>
```

However, such approach for defining instructions is inconvenient since every legal operation on every object needs an independent instruction.

An embodiment in which the interface standard is implemented by invoking a function is explained hereinafter. In the embodiment, the upper interface unit sends an instruction to the docbase management system by invoking an interface function of the lower interface unit. The embodiment, called the UOI, is explained with reference to C++ language.

Define a UOI return value structure:

```
struct UOI_Ret {
    BOOL   m_bSuccess; // whether the operation succeeds.
    CString m_ErrInfo; }; // when the operation fails, show error
    information.
```

Then, the basic classes of all UOI objects are defined.

```
class UOI_Object {
public:
    enum Type { // type definition
        TYPE_DOCBASE, // docbase
        TYPE_DOCSET, // docset
        TYPE_DOC, // doc
```

-continued

```
        TYPE_PAGE, // page
        TYPE_LAYER, // layer
        TYPE_TEXT, // text
        TYPE_CHARSIZE, // charact size
        ....// the definitions of the types of other objects defined in the
universal document model are similar to the definitions described above
and will not be explained further.
    };
    Type    m_Type; // type
    UOI_Object( ); // constructor function
    virtual ~ UOI_Object( ); // destructor function
    static UOI_Object *Create(Type objType); // create corresponding
object based on a specified type.
    };
```

Define UOI functions as follows in correspondence with the UOML actions in the embodiment of the "operation action+object to be operated" approach.

Open or create a docbase, and return the handle of the docbase in the "pHandle" if the operation succeeds:

UOI_RET UOI_Open (char*path, BOOL bCreate, HANDLE*pHandle).

Close the handle in the db_handle docbase, and if the handle value is NULL, the whole docbase will be closed:

```
UOI_RET UOI_Close (HANDLE handle, HANDLE db_handle).
Get the handle of a specified subobject:
UOI_RET UOI_GetHandle (HANDLE hParent, int nPos, HANDLE *pHandle).
Get the type of the object pointed to by the handle:
UOI_RET UOI_GetObjType (HANDLE handle, UOI_Object ::Type *pType).
Get the data of the object pointed to by the handle:
UOI_RET UOI_GetObj (HANDLE handle, UOI_Object *pObj).
Get a page bitmap:
UOI_RET UOI_GetPageBmp (HANDLE hPage, RECT rect, void *pBuf).
Set an object:
UOI_RET UOI_SetObj (HANDLE handle, UOI_Object *pObj).
Insert an object:
UOI_RET UOI_Insert (HANDLE hParent, int nPos, UOI_Object *pObj, HANDLE
*pHandle = NULL).
Delete an object:
UOI_RET UOI_Delete (HANDLE handle).
```

Search, and the number of search results is returned in "pResultCount" while the handles of the search results are returned in "phResult":

UOI_RET UOI_Query (HANDLE hDocbase, const char*strcondition, HANDLE*phResult, int*pResultCount).

Define various UOI objects. The following examples include UOI_Doc, UOI_Text and UOML_CharSize.

```
class UOI_Doc : public UOI_Object {
public:
    UOI_MetaData m_MetaData; // metadata
    int              m_nPages; // page
    UOI_Page        **m_pPages; // page point
    int              m_nFonts; // number of fonts
    UOI_Font       **m_pFonts; // list of font
    UOI_Navigation m_Navigation ; // navigation object
    UOI_Thread      m_Thread ; // thread
    UOI_MiniPage   *m_pMiniPages ; // minipage
    UOI_Signature   m_Signature ; // signature
    int              m_nShared ; // number of shared objects
    UOI_Obj        *m_pShared ; // list of shared objects
    UOI_Doc( );
    virtual ~UOI_Doc( ) ;
};
```

-continued

```
class UOI_Text : public UOI_Object {
public:
    enum Encoding {
        ENCODE_ASCII, // ASCII encoding
        ENCODE_GB13000, // GB13000 encoding
        ENCODE_UNICODE, // UNICODE encoding
        ......
    };
    Encoding    m_Encoding; // type of encoding
    char    *m_pText ; // character string
    Point        m_Start ; // the startpoint
    int        *m_CharSpace; // character space array
    UOI_Text( ); // constructor function
    virtual ~ UOI_Text( ); // destructor function
};
// definiation of UOI-CharSize
class UOI_CharSize : public UOI_Object {
public:
    int m_Width; // width
    int m_Height; // height
    UOI_CharSize( ); // constructor function
    virtual ~UOI_CharSize( ); // destructor function
};
```

The method of applying the UOI is explained with reference to the following example. First a docbase is created:

```
ret = UOI_Open("f:\\data\\docbase1.sep", TRUE, &hDocBase).
Construct a function used for inserting a new object.
HANDLE InsertNewObj (HANDLE hParent, int nPos, UOI_Object ::Type type)
{
UOI_Ret    ret; // return value
HADNLE    handle; // return handle
UOI_Obj    *pNewObj = UOI_Obj::Create (type); // create an object
if (pNewObj == NULL)
    return NULL; // fail to creat and return null
ret = UOI_Insert(hParent, nPos, pNewObj, &handle) ; // insert into a parent node and
return the object handle
    delete pNewObj ; // delete an interim object
    return ret.m_bSuccess ? handle : NULL; // return the object handle if success, or
return null
    }
Construct a function used for getting an object directly.
UOI_Obj *GetObj(HANDLE handle)
{
UOI_Ret    ret; //return value
UOI_Object ::Type    type; // object type
UOI_Obj    *pObj; // object point
ret = UOI_GetObjType(handle, &type); // get a type
if ( !ret. m_bSuccess )
    return NULL; // return null if fail to return
pObj = UOI_Obj::Create(type); // create an object of the type
if (pObj == NULL)
    return NULL; // return null if the new created object is null
ret = UOI_GetObj(handle, pObj); //get an object
if ( !ret. m_bSuccess ) {
    delete pObj; // delete an interim point if fail
    return NULL;
}
return pObj; // return an object point
}
```

When an interface function is defined for every operation on every object, the instruction for inserting a docset is sent to the docbase management system by the upper interface invoking the interface function of the lower interface in the following way:

UOI_InsertDocset (pDocbase, 0).

The interface standard may also encapsulate various object classes, e.g., a docbase class, and define an operation to be performed on the object as a method of the class, e.g.:

A compact disk containing the computer code in the application, which compact disk is entitled SUR0019computerprogram.doc created on Mar. 5, 2012, containing 96KB is incorporated herein by reference The upper interface unit sends an operating instruction of inserting a docset to the docbase management system by invoking a function of the lower interface unit in following method: pDocBase.InsertDocset(0).

Different interface standards can be designed in the same way as described above for applications developed based on Java, C#, VB, Delphi, or other programming languages.

As long as an interface standard includes no feature associated with a certain operation system (e.g., WINDOWS, UNIX/LINUX, MAC OS, SYMBIAN) or hardware platform (e.g., x86CPU, MIPS, PowerPC), the interface standard can be applied cross-platform so that different applications and docbase management systems on different platforms can use the same interface standard. Even an application running on one platform may invoke a docbase management system running on another platform to proceed with an operation. For example, when the application is installed on a client terminal in a PC using Windows OS and the docbase management system is installed on a server in a mainframe using Linux OS, the application can still invoke the docbase management system on the server to process documents just like invoking a docbase management system on the client terminal.

When the interface standard includes no feature associated with a certain program language, the interface standard is further free from dependency on the program language. It can be seen that the instruction string facilitates the creation of a more universal interface standard independent of any platform or program language, especially when the instruction string is in XML, because all platforms and program languages in the prior art have easy-to-get XML generating and parsing tools. Therefore, the interface standard will fit all platforms perfectly and be independent of program languages, and the interface standard will make it more convenient for engineers to develop an upper interface unit and a lower interface unit.

More interface standards can be developed based on the same method of defining the interface standard described above, and should be covered by the protection scope of the present invention.

One skilled in the art can understand that more operating instructions can be added to the interface standard based on the embodiments described above in the method of constructing instructions as described above, and the operating instructions can also be simplified based on the embodiments. When the universal document model is simplified, the operating instructions can be simplified accordingly. The interface standard can include at a minimum the operating instructions for creating a document, creating a page, and creating a layout object.

Document Processing

The working process of the document processing system in a preferred embodiment of the present invention is further explained with reference to FIG. 1.

The application must comform with a unified isnterface standard, e.g., e.g., the Office software, a contents management application, a resource collection application, etc. The application sends an instruction to the docbase management system when the application needs to process a document, and the docbase management system performs a corresponding operation according to the instruction.

The docbase management system may store and organize the data of the docbase in any form, e.g., the docbase management system may save all documents in a docbase in one file on a disk, or create one file on the disk for one document and organize the documents by using the file system functions of the operating system, or create one file on the disk for one page, or allocate room on the disk and manage the disk tracks and sectors without referencing the operating system. The docbase data can be saved in a binary format, in XML, or in binary XML. The page description language (used for defining objects including texts, graphics, and images in a page) may adopt PostScript, PDF, or SPD, or a customized language. In summary, any implemented method that achieves the interface standard functions defined herein is acceptable.

For example, the docbase data can be described in XML and when the universal document model is hierarchical, an XML tree can be built accordingly. An operation of inserting adds a node in the XML tree and an operation of deleting deletes a node in the XML tree, an operation of setting sets the attributes of a corresponding node, and an operation of getting gets the attributes of the corresponding node and returns the attribute information to the application, and an operation of querying traverses all related nodes. A further description of an embodiment is given as follows:

1. XML is used for describing every object; therefore an XML tree is created for each object. Some objects show simple attributes and the XML trees corresponding to the objects will have only the root node; some objects show complicated attributes and the XML trees corresponding to the objects will have root node and subnodes. The description of the XML trees can be created with reference to the XML definitions of the operation objects given in the foregoing description.

2. When a new docbase is created, a new XML file whose root node is the docbase object is created.

3. When a new object (e.g., a text object) is inserted into the docbase, the XML tree corresponding to the new object is inserted under the corresponding parent node (e.g., a layer). Therefore, every object in the docbase corresponds to a node in the XML tree whose root node is the docbase.

4. When an object is deleted, the node corresponding to the object and the subnodes thereof are deleted. The deletion starts from a leaf node in a tree traversal from the bottom to the top.

5. When an attribute of an object is set, the attribute of the node corresponding to the object is set to the same value. If the attribute is expressed as an attribute of a subnode, the attribute of the corresponding subnode is set to the same value.

6. In the process of getting an attribute of an object, the node corresponding to the object is accessed and the attribute of the object is retrieved according to the corresponding attribute and subnodes of the node.

7. In the process of getting the handle of an object, the XML path of the node corresponding to the object is returned.

8. When an object (e.g., a page) is copied to a specified position, the whole subtree starting from the node corresponding to the object is copied to a position right under the parent node corresponding to the specified position (e.g., a document). When the object is copied to another docbase, the object referenced by the subtree (e.g., an embedded font) is also copied.

9. In the process of performing an instruction of getting a page bitmap, a blank bitmap in a specified bitmap format is created first in the same size of the specified area, then all layout objects of the specified page are traversed. Every layout object in the specified area (including the objects that have only parts in the area) is rendered and displayed in the blank bitmap. The process is complicated and can be performed by those skilled in the art; however, the process is still covered by the RIP (Raster Image Processor) technology in the prior art and will not be described herein.

Document Security

When a role object is created, a random PKI key pair (e.g., 512-digits RSA keys) is generated, the public key of the PKI key pair is saved in the role object, and the private key is returned to the application.

When the application logs in, a random data block (e.g., 128 bytes) is generated and encrypted with the public key of the corresponding role object to obtain the cipher data. The cipher data are sent to the application, the application decrypts the cipher data block and the decrypted data block is authenticated. If the data block is correctly decrypted, the application is proved to possess the private key of the role and will be allowed to log in. Such authentication process may be repeated for three times, and the application is allowed to log in only when the application passes all three authentication processes.

When a target object is signed to obtain a signature, the subtree starting from the node corresponding to the object is signed to obtain the signature. The subtree is regularized first so that the signature will be free from any effects of physical storage variation, i.e., by logically equivalent alterations (e.g., changes of pointer caused by the changes of storage position). The regularization method includes:

traversing all nodes in the subtree whose root node is the target object (i.e., target object and the subobject thereof) in a depth-first traversal, regularizing each node in the order of the traversal and joining the regularization result of each node.

The regularization of a node in the subtree includes: calculating the HASH value of the subnode number of the node, calculating the HASH values of the node type and node attributes, joining the obtained HASH values of the node type and node attributes right behind the HASH value of the subnode number according to the predetermined order, and calculating the HASH value of the joined result to obtain the regularization result of the node. When an object also needs to be signed to obtain the signature because the object is referenced by a node in the subtree, the object is regarded as a subnode of the node and is regularized in the method described above.

After the regularization, the HASH value of the regularization can be generated and the signature can be obtained by encrypting the HASH value with the private key of the role according to the techniques in the prior art, which will not be described herein.

In the regularization process, the regularization of a node in the subtree may also include: joining the subnode number of the node, the node type and node attributes in an order with separators in between, and calculating the HASH value of the joined result to obtain the regularization result of the node. Or, the regularization of a node in the subtree may include: joining the subnode number length, the node type length, and the node attribute lengths in an order with separators in between, and further joining the already joined lengths with the subnode number, node type and node attributes, then the regularization result of the node is obtained. In summary, the step of regularizing a node in the subtree may include the following step: joining original values or transformed values (e.g., HASH values, compressed values) of: the subnode number, node type, and node attributes, and the lengths of the subnode number/node type/node attributes (optional), in a predetermined order directly or with separators in between.

The predetermined order includes any predetermined order of arranging the subnode number length, node type length, node attribute lengths, subnode number, node type, and node attributes.

In addition, either depth-first traversal or width-first traversal is applied in the traversal of the nodes in the subtree.

It is easy to illustrate various modifications of the technical scheme of the present invention. For example, the scheme may include joining the subnode number of every node with separators in between in the order of depth-first traversal and then joining with the regularization results of other data of every node. Any method that arranges the subnode numbers, node types and node attributes of all nodes in the subtree in a predetermined order constitutes a modification of this embodiment.

When setting a privilege on an object, the simplest method includes: recording the privileges of every role on the object (including the subobjects thereof) and comparing the privileges of the role when the role accesses the object. If an operation is within the privileges, the operation is accepted; otherwise error information is returned. A preferred method applied to the present invention includes: encrypting corresponding data and controlling a privilege with a key; when a role cannot present the correct key, the role does not have a corresponding privilege. This preferred method provides better anti-attack performance. A detailed description of the steps of the preferred method is as follows.

a) A PKI key pair is generated for a protected data region (usually a subtree corresponding to an object and the subobjects thereof), and the data region is encrypted with the encryption key of the PKI key pair.

b) When a role is granted read privilege, the decryption key of the PKI key pair is passed to the role and the role may decrypt the data region with the decryption key in order to read the data correctly.

c) When a role is granted write privilege, the encryption key of the PKI key pair is passed to the role and the role may encrypt modified data with the encryption key in order to write data into the data region correctly.

d) Since the encryption/decryption efficiency of the PKI keys is low, a symmetric key may be used for encrypting the data region. The encryption key further encrypts the symmetric key while the decryption key may decrypt the cipher data of the symmetric key to retrieve the correct symmetric key. The encryption key may be further used for signing the data region to obtain a digital signature to prevent a role with the read privilege only from modifying the data when the role is given the symmetric key. In such a case, a role with the write privilege signs the data region to obtain a new signature every time the data region is modified; therefore, the data will not be modified by any role without the write privilege.

e) When a role is given the encryption key or decryption key, the encryption key or decryption key may be saved after being encrypted by the public key of the role, so that the encryption key or decryption key can only be retrieved with the private key of the role.

The technical scheme for enhancing the system security and document security will be described hereinafter.

A role can be identified with one unique ID and one unique PKI key pair, however, the role object saves only the ID and the public key of the role, the private key of the role is given to the application. The ID of a role can be any number or string as long as different roles are given different IDs. The PKI algorithm can be either ECC algorithm or RSA algorithm.

The system for document data security management of the present invention includes a role management unit, a security session channel unit, an identity authentication unit, an access control unit and a signature unit.

The process performed by the application from using a role (or roles) to log in so as to performing a number of operations and to logging out is regarded as a session. A session can be identified with session identification and a logged role list. The session can be performed on a security session channel in the security session channel unit which keeps at least a session key for encrypting the data transmitted on the security session channel. The session key may be an asymmetric key, or a commonly used symmetric key with more efficiency.

The identity authentication unit is used for authenticating the identity of a role when the role logs in. The identity authentication is role-oriented and a role after presenting the key of the role can log in. When a role wants to log in and the key of the role is a PKI key, the identity authentication unit retrieves the public key of the role from the role object according to the role ID and authenticates the identity of the role by using the "challenge-response" mechanism described in the foregoing description.

The role management unit is used for creating a role, granting a privilege to a role and bereaving a role of a privilege.

The access control unit is used for setting an access control privilege for document data, and a role can only access document data according to the access control privilege granted to the role. The privilege data can be managed by the access control unit so that some roles may acquire the privilege of other role and some roles may not. A role can modify privileges of other roles in normal re-license or bereave process only when the role is granted re-license privilege or bereave privilege; directly writing data into the privilege data is not allowed.

Each operation is further explained herein.

1. When a docbase is created, the role management unit automatically grants all possible privileges on the docbase, including read privilege, write privilege, re-license privilege and bereave privilege on all objects, to the default role of the docbase.

2. Set up a security session channel initiate a session.

a) Determine whether the session has been successfully initiated according to session identification; if the session has been successfully initiated, the security session channel setup process shall end, and otherwise the security session channel setup process shall proceed.

b) Either the application or the docbase management system generates a random PKI key pair.

c) The party which generates the random PKI key pair sends the public key of the PKI key pair to the other party.

d) The other party generates a random symmetric key as the session key, encrypts the session key with the public key and sends the encrypted session key to the party which generates the random PKI key pair.

e) The party which generates the random PKI key pair decrypts the encrypted session key with the private key of the PKI key pair.

f) Set up session identification.

g) Set the logged role list as the default role.

3. Role logs in a) The application provides the ID of a role that shall log in and a docbase in which the role shall log.

b) The identity authentication unit checks the logged role list of the session, if the role (including the default role) has logged in, this step shall end; otherwise this step shall proceed.

c) The identity authentication unit retrieves the public key of the role from the role object.

d) The identity authentication unit generates a random data block and encrypts the data block with the public key of the role.

e) The identity authentication unit sends the encrypted data block to the application.

f) The application decrypts the encrypted data block with the private key of the role and sends the decrypted data back to the identity authentication unit.

g) The identity authentication unit checks whether the returned data is correct, and if the data is incorrect, the role will fail to log in, otherwise proceed.

h) Add the role into the logged role list of the session.

4. Create a new role a) The application issues an instruction of creating a new role.

b) The role management unit generates a unique role ID.

c) The role management unit generates a random PKI key pair.

d) The role management unit creates a role object in the docbase and saves the ID and the public key in the role object, and the privilege of the role is null, i.e., the role has no privilege on any object.

e) Return the ID and the private key to the application.

5. Grant a privilege P on an object O to a role R a) The application sends a privilege request.

b) The role management unit obtains the union of the privileges of all roles in the logged role list on the object O and determines whether the union is a superset of the privilege P and whether the union includes re-license privilege. If the union is not a superset of the privilege P or the union does not includes the re-license privilege, the granting of the privilege will fail (because the privileges of all the roles still do not include a privilege used for granting), otherwise the process shall proceed.

c) The role management unit adds the privilege P on the object O into the privilege list of the role R. If the privilege P does not include read or write privilege, the privilege granting process is completed, otherwise the process continues.

d) The access control unit checks whether read/write access control privilege is set up on the object O. If no read/write access control privilege is set up on the object O, steps as follows shall be performed.

i. Generate a random symmetric key and a random PKI key pair.

ii. Encrypt the object O with the symmetric key; if the read/write access control privilege is set up on a subobject of the object O, the subobject shall remain unchanged.

A PKI key pair shall be generated for a data sector to be protected (usually a subtree corresponding to an object and the subobjects thereof), and the data sector is encrypted with the encryption key of the PKI key pair.

iii. Encrypt the symmetric key with the encryption key of the PKI key pair, save the encryption word and sign the target object to obtain a signature.

iv. Check all roles in the docbase. If a role has read privilege on object O (here the object O may be a subobject of the object on which the role has the read privilege), the decryption key shall be encrypted with the public key of the role and encryption word of the decryption key is saved in the privilege list of the role. If a role has write privilege on object O (here the object O may be a subobject of the object on which the role has the write privilege), the encryption key shall be encrypted with the public key of the role and encryption word of the encryption key is saved in the privilege list of the role.

v. Proceed to Step h).

e) Choose a role that has needed privilege (the read privilege or write privilege) on the object O from all logged roles.

f) Obtain the encryption word of a corresponding key corresponding to the object O from the privilege list of the role (the read privilege requires the decryption key and the write privilege requires the encryption key, the combination of the read privilege and write privilege requires both keys), and send the encryption word of the corresponding key to the application.

g) The application decrypts the encryption word of the corresponding key with the private key of the role to retrieve the key and returns the key to the access control unit.

h) Encrypt a key corresponding to the privilege P with the public key of the role R, generates corresponding encryption word of the corresponding key and saves the encryption word into the privilege list of the role R.

6. Bereave a role R of a privilege P on an object O a) The application sends a request of bereaving of a privilege.

b) The role management unit checks all roles in the logged role list to determine whether there is a role has a bereave privilege on the object O. If no role has the bereave privilege, the process of bereaving of the privilege will fail, otherwise the process continues.

c) Delete the privilege P from the privileges of the role R on the object O.

d) If the privilege P includes read or write privilege, corresponding decryption key or encryption key for the object O shall be removed from the privilege list of the role R.

7. Read an object O a) The application sends an instruction of reading the object O.

b) The access control unit checks the privileges of all roles in the logged role list on the object O and determines whether there is at least one role in the logged role list has read privilege on the object O. If no role has the read privilege, the reading process fails; otherwise the process continues.

c) Check whether read/write access control privilege is set up on the object O. If no read/write access control privilege is set up, check the parent object of the object O and the parent object of the parent object until an object with the read/write access control privilege is found.

d) Choose a role that has the read privilege on the found object.

e) Send the encryption word of the decryption key of the found object from the privilege list of the role to the application.

f) The application decrypts the encryption word of the decryption key with the private key of the role to retrieve the decryption key and returns the decryption key to the access control unit.

g) The access control unit decrypts encryption word of the symmetric key of the object with the decryption key to retrieve the symmetric key of the object.

h) Decrypt encryption word of the data of the object O with the symmetric key to retrieve the data of the object O.

i) Return the decrypted data of the object O to the application.

8. Write an object O a) The application sends an instruction of writing into the object O.

b) The access control unit checks the privileges of all roles in the logged role list on the object O and determines whether there is at least one role in the logged role list has write privilege on the object O. If no role has the write privilege, the writing process fails, otherwise the process continues.

c) Check whether read/write access control privilege is set up on the object O. If no read/write access control privilege is set up, check the parent object of the object O and the parent object of the parent object until an object O1 with the read/write access control privilege is found.

d) Choose a role that has the write privilege on the object O1.

e) Extract the encryption word of the encryption key of the object O1 from the privilege list of the role. When the key of the role is a PKI key, the encryption word of the encryption key is sent to the application and Step f) is performed. When the key of the role is a login password, the access control unit decrypts the encryption word of the encryption key and Step g) shall be performed.

f) The application decrypts the encryption word of the encryption key with the private key of the role to retrieve the encryption key of the object O1 and returns the encryption key of the object O1 to the access control unit.

g) Encrypt modified data of the object O with the encryption key of the object O1 (if read/write access control privilege is set up on a subobject of the object O, the subobject is encrypted with the original key of the subobject).

h) Overwrite the original data with the encrypted data and the writing process shall end.

9. Sign an object O to obtain a signature a) The application sends an instruction of signing an object O to obtain a signature.

b) The signature unit regularizes the data of the object O using the regularization method given in the foregoing description.

c) Calculate HASH value of the regularization result.

d) Send the HASH value to the application.

e) The application encrypts the HASH value with the private key of the role (i.e., the signature) when the key of the role in the logged role list is a PKI key.

f) The application returns the signature result to the access control unit g) The access control unit saves the signature result in a digital signature object.

10. log out a logged role a) The application sends an instruction for logging out a logged role.

b) The security session channel unit deletes the logged role from the logged role list if the logged role list includes the logged role.

11. Terminate session a) Either the application or the docbase management system sends a session termination request.

b) The security session channel unit terminates all threads related to the present session, erases the session identification and deletes the logged role list.

The steps described above can be enhanced or simplified in practical applications to improve work efficiency, e.g., the private keys of the roles may be cached in the session data (which will be deleted when the session is terminated), therefore the private keys need not to be sent to the application for decryption every time, or some security measures may be omitted, or some functions may be removed. To sum up, all simplifications of the method are equivalent modifications of the method of the present invention.

The document security technique provided by the present invention, including role oriented privilege management, security session channel, role authentication, login of multiple roles, regularization method for tree structure, fine-grained privilege management unit, privilege setup based on encryption, etc., can be applied to other environment as well as the document processing system provided by the present invention, and the present invention does not limit the applications of the document security technique.

Processing a Document on Layers

In the document processing system to which the present invention is applied, an "add without modification" scheme is adopted to enable the document processing system to be paper fidelity. Every application adds new contents to the existing document contents without altering or deleting any existing document contents; therefore, a page of the document is like a piece of paper on which different people write or draw with different pens while nobody can alter or delete the existing contents.

In an embodiment of the present invention in which a document is processed on layer, when the application editing the document conforming with the universal document model, a page object is inserted into the document object and a layout object is inserted into the page object wherein each layer in a same page is arranged according to an order. The docbase management system further manages and controls the layers separately.

For example, while editing a document created by another application, the application adds a new layer into the document and puts all contents added by the application into the new layer without altering or deleting contents in existing layers. Every layer of the document can be managed and maintained by one application, and no other application is allowed to edit the layer. This is a paper-based society. As long as the document processing system maintains all the features of paper, it can perfectly satisfy all present practical needs.

A digital signature object of a layer can be used for guaranteeing that the contents in the layer are not altered or deleted. The contents of the layer may be signed to obtain the digital signature; yet preferably, the contents of the layer and the contents of all layers created before the layer are signed to obtain the digital signature. The signature does not prevent further editing of the document such as inserting new comment into the documents, and the signature always remains valid as long as the newly added contents are placed in a new layer without modifying the layers that are signed to obtain the signature. However the signer of the signature is responsible only for the contents before the signature is created and is not responsible for any contents added after the signature is created. This technical scheme perfectly satisfies practical needs and is highly valuable in practice since the signature techniques in the prior art either forbid editing or destroy the signature after editing (even though the editing process including only adding without altering).

The technical scheme provided in the foregoing description does not allow alteration of existing contents in the document, even not in consideration of paper features and digital signature, all modifications are made based on a layout object, i.e., editing (adding, deleting, modifying) a layout object does not affect any other layout objects. Since the universal document model is constructed based on visible components and does not include any invisible components and relations among layout objects, the modification of one layout object does not bring related modification on any other objects, e.g., deleting a character result in no left-ward moving of characters on the right, but a blank space. A display/print mode of each layer can further be set, e.g., when a layer is displayed/printed, the layer and all other layers created prior to the layer shall be displayed/printed. The display/print mode of a layer also can be set to watermark mode, overlap mode or invisible mode. The display/print mode of the document can be set to display/print all layers one on top of another.

When a user needs to edit existing contents in the document in the original, another technical scheme will satisfy the need well. The technical scheme allows the application to embed a source file (a file which is saved in the format of the application's own and which keeps a full relationship record of all objects in the document, e.g., a .doc file) into the document after the application has finished the initial editing and created a new layer for the newly edited contents. The next time the document needs to be edited, the source file is extracted from the document and the document is edited by using the source file. After the second editing process, the layer managed by the application is cleaned and the contents of the layer are regenerated. The modified source file is embedded into the document again.

To be specific, the technical scheme includes the steps as follows:

1. When the application processes the document for the first time, the application creates a new layer and inserts the layout object(s) corresponding to the newly added contents into the new layer. At the same time, the application saves the newly added contents in the format defined by the application (i.e., the source file).

2. The application creates a source file object under the document object as a sub-object of the document object to embed the source file (e.g., embed as a whole in binary data format), and records the layer corresponding to the source file object.

3. When the same application edits the document for the second time, the application extracts the corresponding source file from the corresponding source file object.

4. The application continues to edit the contents in the corresponding layer by modifying the source file. Since the source file is saved in the format defined by the application, the application may edit the contents with functions of the application.

5. After the second editing process ends, the contents of the layer are updated according to the newly edited contents (e.g., by the method of regenerating all after cleaning all), and the modified source file is embedded into the document object again.

6. This process is repeated to enable the application to edit the existing contents in the document in a conventional way.

The technical scheme of the present invention can maximize document interoperability. When the technical scheme of the present invention is applied to both applications and documents, and the precondition of sufficient privileges is ensured, the following functions can be achieved.

1. All types of applications can correctly open, display, and print all types of documents.

2. All types of applications can add new contents to all types of documents without damaging existing signatures in the documents.

3. When no signature exists or an existing signature is allowed to be destroyed, all types of applications can edit existing contents of all types of documents based on layouts.

4. Existing contents of all types of documents can be edited in the conventional way by the original application that created the existing contents in the documents.

It can be seen that the present invention greatly facilitates the management, interoperability and security setting for the document by using the layer management.

It can be understood that the method provided by the present invention for processing the document based on different layers can be applied to other systems in which documents are stored on pages as well as the document processing system.

Furthermore, the present invention includes grouping data according to a predetermined rule, e.g., according to a management entity of the data, or according to time of processing the document, or according to a function of the data.

Workflow is further explained with reference to an example in which Application A creates a document and Application B edits the document. UOI is used as the interface standard in the example.

1. Application A sends an instruction to create a docbase c:\sample\mydoc\base.sep, and save the handle of the docbase in hDocBase:

UOI_Open ("c:\\sample\\mydocbase.sep", TRUE, &hDocBase).

2. Application A sends an instruction to insert a docset in the docbase hDocBase, and save the handle of the docset in the hDocBase:

hDocSet=InsertNewObj(hDocBase, 0, UOI_Obj::TYPE_DOCSET); in this embodiment the docbase includes only one docset, regarded as a first docset.

3. Application A sends an instruction to insert a document in the docset hDocBase, and save the handle of the docset in hDoc:

hDoc=InsertNewObj(hDocSet, 0, UOI_Obj::TYPE_DOC); in this embodiment the docset includes only one document, regarded as a first document.

4. Application A sends an instruction to create a page in the document hDoc with a width of w and a height of h, and save the handle of the page in hPage:

UOI_Page page;
page.size.w=w;
page.size.h=h;
UOI_Insert(hDoc, 0, &page, &hPage); in this embodiment the document includes only one page, regarded as a first page.

5. Application A sends an instruction to insert a layer in page hPage, and save the handle of the layer in hLayer:

hLayer=InertNewObj (hPage, 0, UOI_Obj::TYPE_LAYER); in this embodiment the page includes only one layer, regarded as a first layer.

6. Application A sends an instruction to set a character size as s:
UOI_CharSize charSize;
charSize.m_Width=charSize.m_Height=s;
UOI_Insert(hLayer, 0, &charSize); in this embodiment, the first layout object on the layer is a character size object.

7. Application A sends an instruction to insert a string "Sursen rises with fresh energy" at coordinates (x1, y1):
UOI_Text text;
text.m_pText=Duplicate ("Sursen rises with fresh energy");
text.m_Encoding=UOI_Text::ENCODE_GB13000;
text.m_Start.x=x1;
text.m_Start.y=y1;
UOI_Insert(hLayer, 1, &text); in this embodiment, the second layout object on the layer is a character object.

8. Application A sends an instruction to close the docbase hDocBase:
UOI_Close (hDocBase);

9. Application B sends an instruction to open the docbase c:\sample\mydocbase.sep, and save the handle of the docbase in the hDocBase:
UOI_Open ("c:\\sample\\mydocbase.sep", FALSE, &hDocBase);

10. Application B sends an instruction to get a pointer to the first docset in the docbase hDocBase, and the handle of the first docset is saved in the hDocSet:
UOI_GetHandle (hDocBase, 0, &hDocSet).

11. Application B sends an instruction to get a pointer to the first document in the docset hDocSet, and the handle of the first document is saved in the hDoc:
UOI_GetHandle (hDocSet, 0, &hDoc).

12. Application B sends an instruction to get a pointer to the first page in the document hDoc, and save the handle of the point in the hPage:
UOI_GetHandle (hDoc, 0, &hPage).

13. Application B gets the layout bitmap of the page used for displaying the page:
UOI_GetPageBmp (hPage, rect, buf).

14. Application B sends an instruction to get a pointer to the first layer in the hPage, and save the handle of the point in the hLayer:
UOI_GetHandle (hPage, 0, &hLayer).

15. Application B sends an instruction to get the handle of the first layout object hObj:
UOI_GetHandle (hLayer, 0, &hObj).

16. Application B sends an instruction to get the type of hObj:
UOI_GetObjType (hObj, &type).

17. Application B judges that the object is a character size object and gets the object:
UOI_GetObj (hObj, &charSize).

18. Application B magnifies the character height by 100%:
charSize.m_Height*=2;
UOI_SetObj(hObj, &charSize).

Application B gets the page bitmap and displays the page. Now the string "Sursen rises with fresh energy" is in heightened character size.

Figure 10:
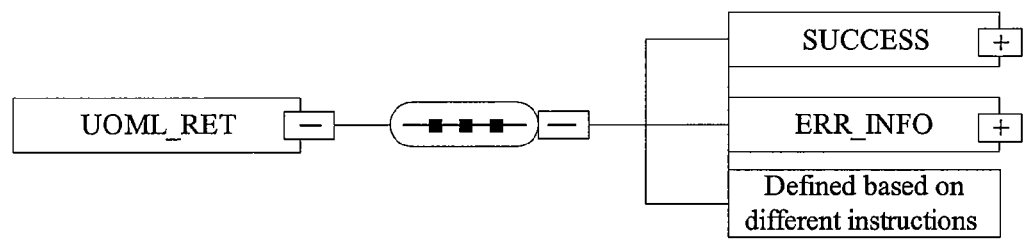
FIG. 10 shows the definition structure of the operation action given by the interface layer according to an executing result.
Figure 18:
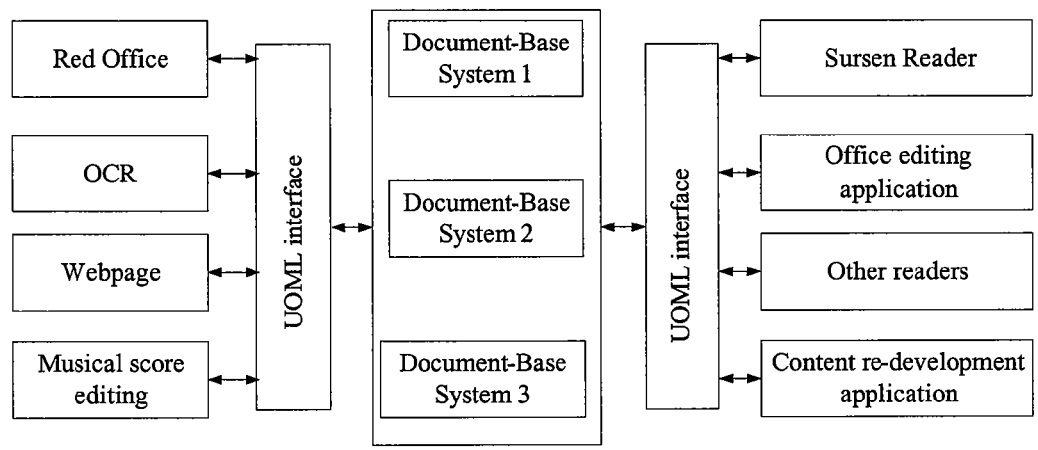
FIG. 18 is a schematic illustrating the processing of the document processing system with UOML interface.

An embodiment of the present invention is given hereinafter with reference to FIG. 18 to illustrate an operation performed by the document processing system conforming with the present invention. In the embodiment, the application requests to process a document through a unified interface standard (e.g., UOML interface). The docbase management systems may have different models developed by different manufacturers, but the application developers always use the same interface standard so that the docbase management systems of any model from any manufacturer are compatible with the application. The application e.g., Red Office, OCR, webpage generation software, musical score editing software, Sursen Reader, Microsoft Office, or any other reader applications, instructs a docbase management system via the UOML interface to perform an operation. Multiple docbase management systems may be employed, shown in FIG. 10 as DCMS 1, DCMS 2 and DCMS 3. The docbase management systems process documents conforming with the universal document model, e.g., create, save, display and present documents, according to a unified standard instruction from the UOML interface. In the present invention, different applications may invoke the same docbase management system at the same time or at different time, and the same application may invoke different docbase management systems at the same time or at different time.

The present invention separates the application layer and the data processing layer so that a document can be processed by different applications; hence, excellent document interoperability is achieved between different applications.

With the present invention, the industry may be divided into different divisions, duplicated development can be avoided, and the industry may evolve to be more professional, thorough and accurate since basic document operations are performed in the docbase management system and need not be replicated in applications. The professional developers of the docbase management system can guarantee its quality, completeness, and accuracy. Application providers and users may choose the best docbase management system provider to achieve accuracy and consistency in document processing.

The present invention provides management for multiple documents, even massive documents; hence, the documents can be organized effectively to facilitate search and storage and to embed a powerful information security mechanism.

The present invention provides a better security mechanism, multiple role setup and fine-grained role privilege setup. The "fine-grained" feature includes two aspects: on the one hand, a privilege may be granted on a whole document or any tiny part of the document, and on the other hand, various privileges may be set up along with the conventional three privilege levels of write/read/inaccessible.

The present invention encourages innovation and reasonable competition. Appropriate industry divisions encourage competition among docbase management system providers and application providers in their respective fields, and application monopoly based on document format, e.g., Microsoft Word, can be avoided. The docbase management system providers can add new functions beyond the standard ones to attract users, so the standard does not restrain innovation.

The present invention improves system performance and provides better transplantability and scalability. Any platform with any function can use the same interface; therefore, the system performance can be optimized continuously without altering the interface standard, and the system may be transplanted to different platforms.

The foregoing description covers the preferred embodiments of the present invention and is not intended to limit the protective scope thereof. All the modifications, equivalent replacements, or improvements in the scope of the present invention's spirit and principles are included within the protective scope of the present invention.

The invention claimed is:

1. A computer-implemented method for processing document data, wherein the document data comprises at least one page in order and the page comprising at least one layer in order, the method comprises:
managing and controlling the at least one layer respectively;

describing visible contents of a layer by utilizing a universal document model that is independent of document formats;

embedding a source file which is in an application's own format into the at least one layer;

extracting the source file corresponding to the at least one layer and providing the source file for the application to edit;

updating the at least one layer based on the edited source file;

re-embedding the edited source file; and when editing document data in a page, inserting a new layer into the page and inserting newly added contents into the new layer without altering and deleting any of the existing layers of the page, wherein the at least one layer comprises at least one layout object and the newly added contents are inserted into the new layer by inserting into the new layer the at least one layout object corresponding to at least one of the newly added contents.

2. The method of claim 1, wherein the layers are distinguished by different management entities or different processing time, or different functions.

3. The method of claim 1, wherein one of the layers is signed to obtain a digital signature; or one of the layers and all layers created prior to the one are signed to obtain a digital signature.

4. The method of claim 1, wherein a specified layer and all layers created prior to the specified one are displayed or printed or displayed and printed one on top of another.

5. The method of claim 1, wherein the managing and controlling the layers respectively comprises: setting display mode or print mode or display and print modes for the layers respectively.

6. The method of claim 5, wherein one layer and all layers created prior to the layer are displayed/printed one on the top of another when one layer is displayed/printed; and/or all layers in a page are displayed/printed one on the top of another when the page is displayed or printed, or displayed and printed.

7. The method of claim 1, wherein updating the layer based on the edited source file comprises:
    cleaning all of the existing content of the at least one layer; and
    regenerating content of the at least one layer based on the edited source file.

8. The method of claim 1, wherein a source file object is created as a sub-object of the document, and the source file is embedded in the source file object.

9. The method of claim 1, further comprising:
    receiving an instruction indicating getting a page bitmap of at least one layer;
    generating a page bitmap, wherein all layout objects in the at least one layer are displayed in order in the page bitmap; and
    returning the page bitmap for displaying.

10. The method of claim 9, wherein the at least one layer comprise a specified layer and all layer created prior to the specified one.

11. The method of claim 1, wherein at least two layers of the layers in a page are described in different page description languages.

* * * * *